United States Patent [19]

Tanaka

[11] Patent Number: 5,345,537
[45] Date of Patent: Sep. 6, 1994

[54] NETWORK REFORMER AND CREATOR

[75] Inventor: Hiroshi Tanaka, Kawasaki, Japan

[73] Assignee: Fujitsu Limited, Kawasaki, Japan

[21] Appl. No.: 810,068

[22] Filed: Dec. 19, 1991

[30] Foreign Application Priority Data

Dec. 19, 1990 [JP] Japan ................... 2-412079

[51] Int. Cl.⁵ ............................................. G10L 9/02
[52] U.S. Cl. ................................. 395/2.64; 395/2.65
[58] Field of Search ............................. 381/29–51;
395/2.64, 2.65

[56] References Cited

U.S. PATENT DOCUMENTS

| | | | |
|---|---|---|---|
| 4,454,586 | 6/1984 | Pirz et al. | 381/41 |
| 4,882,759 | 11/1989 | Bahl et al. | 381/51 |
| 4,903,305 | 2/1990 | Gillick et al. | 381/43 |
| 5,033,087 | 7/1991 | Bahl et al. | 381/43 |

Primary Examiner—Allen R. MacDonald
Assistant Examiner—Michelle Doerrler
Attorney, Agent, or Firm—Staas & Halsey

[57] ABSTRACT

A user inputs a network to an inputter of a network reformer for automatically reforming a network connecting basic units of data per a predetermined rewriting rule. The inputter sends the data to a partial path separator. The partial path separator separates the partial path matching the rewriting source before the predetermined rewriting rule is applied and sends it to a partial path reformer. The partial path reformer reforms a separated partial path by applying a predetermined rewriting rule to the separated partial path. A network merger receives a post-reform partial path and appropriately merges the partial path and the remaining network part, thereby creating a new network.

13 Claims, 22 Drawing Sheets

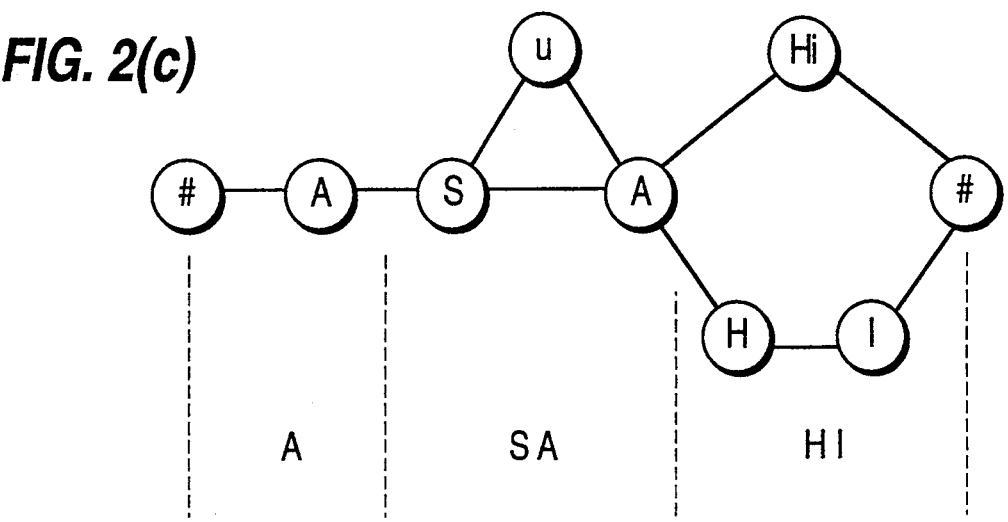
FIG. 2(a) [ A S A H I ]
FIG. 2(b) A—S—A—H—I
FIG. 2(c)
FIG. 4(a)  Q.—B.—C.—C.—R.  [net 7]
Q.—B.—Z.—R.  [net 8]
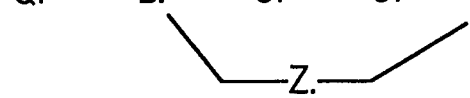
FIG. 4(b)  Q.—B.—C.—C.—R.
                    Z.

FIG. 3(a)
PRIOR ART

| B. | ← A. | | [rule1] |
| B. | ← A. | /C. _R. | [rule2] |
| [B. ، C.] | ← A. | | [rule3] |
| [B. ، C.] | ← A. | /C. _R. | [rule4] |

Q. —B. —C. —A. —R.   [net 1]
Q. —B. —C. —B. —R.   [net 2]

Q. —B.—C.⟨B./C.⟩R.   [net 3]

FIG. 3(b)
PRIOR ART

Z. ← C. B.   [rule5]

Q. —B.—C.⟨Z./C.⟩R.   [net 4]

Q. —B.⟨Z./X—C.⟩R.   [net 5]

FIG. 3(c)
PRIOR ART

| Q. —B. —C. —B. —R | [net 6] |
| Q. —B. —C. —C. —R | [net 7] |
| Q. —B. —Z. —R | [net 8] |

FIG. 6(a)
PRIOR ART
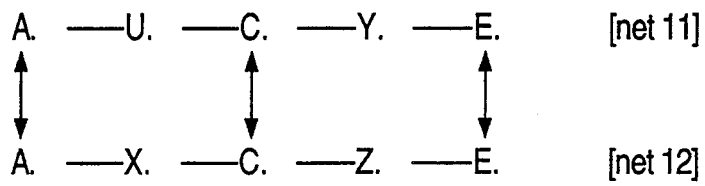
FIG. 6(b)
PRIOR ART
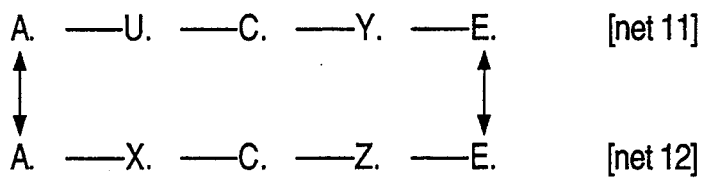
FIG. 6(c)
PRIOR ART
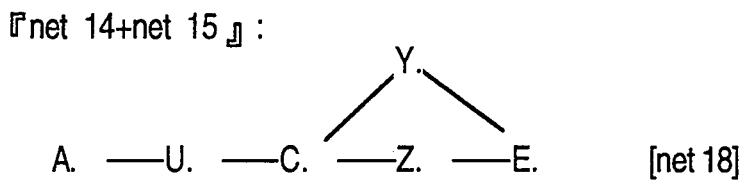
FIG. 6(d)
PRIOR ART
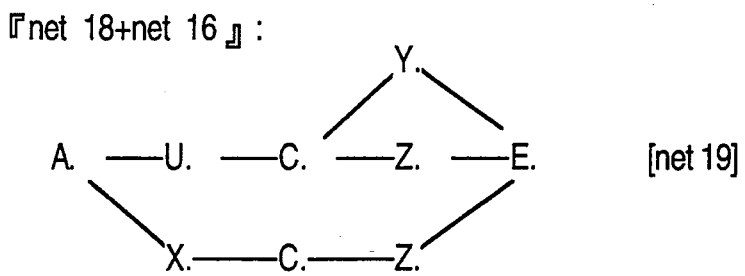
FIG. 6(e)
PRIOR ART
FIG. 6(f)
PRIOR ART
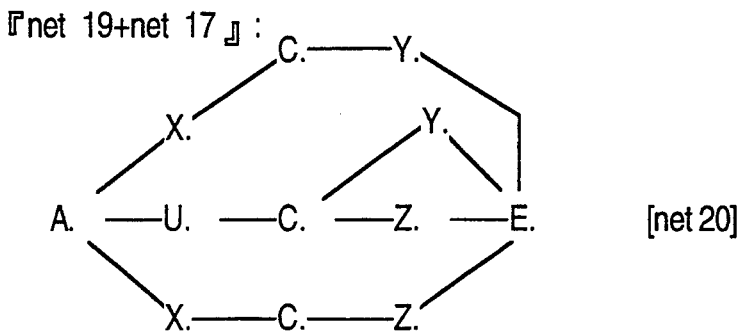

[NETWORK]

[DATA STRUCTURE]

| NODE NUMBER | 1 | 2 | 3 | 4 | 5 | 6 |
|---|---|---|---|---|---|---|
| NODE NAME | A. | B. | C. | D. | E. | F. |
| PREVIOUS NODES | 1 | 1 | 2 | 3 | 3 | 4 5 |
| NEXT NODES | 2 | 3 | 4 5 | 6 | 6 | 6 |

FIG. 9(a)

[REWRITING RULE]

[DATA STRUCTURE]

| TARGET PATTERN TO BE REFORMED | A. B. | |
|---|---|---|
| PREVIOUS CONTEXT | E. | |
| NEXT CONTEXT | F. | |
| POST-REFORMED PATTERNS | C. | D. |

FIG. 12(a) INPUT TO PARTIAL PATH SEPARATOR 712(723)
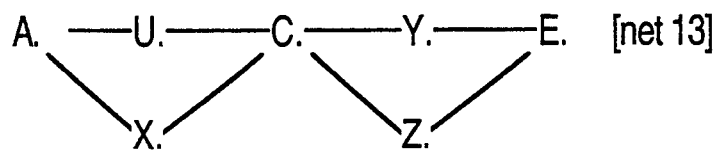
FIG. 12(b) OUTPUT FROM NORMAL DIRECTIONAL PARTIAL PATH SEPARATOR 716
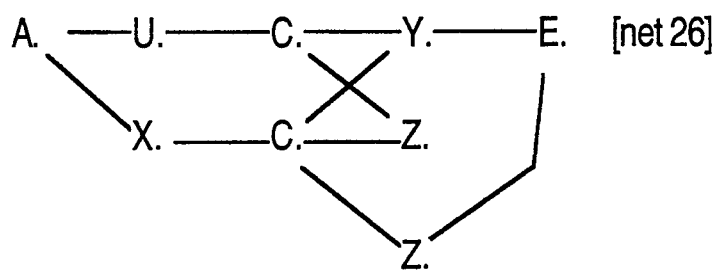
FIG. 12(c) OUTPUT FROM REVERSE DIRECTIONAL PARTIAL PATH SEPARATOR 717
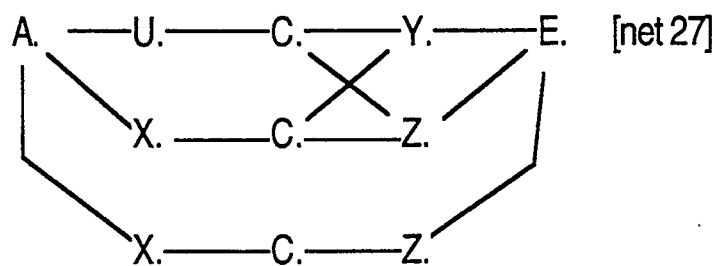

FIG. 13(a) BEFORE SEPARATION
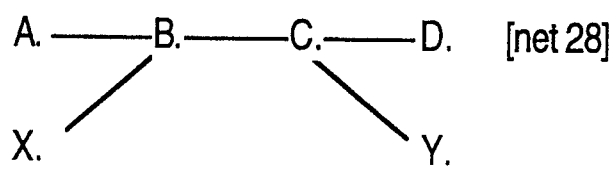
FIG. 13(b) ONE NODE SEPARATED
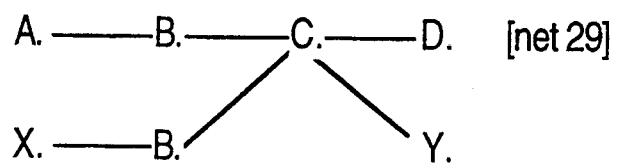
FIG. 13(c) AFTER SEPARATION
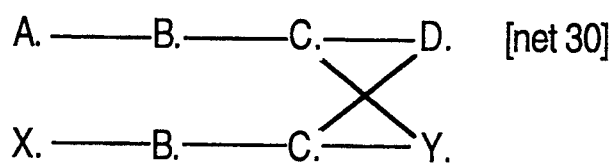

FIG. 20(a) BEFORE MERGER
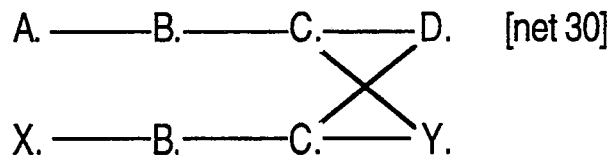
FIG. 20(b) ONE NODE MERGER
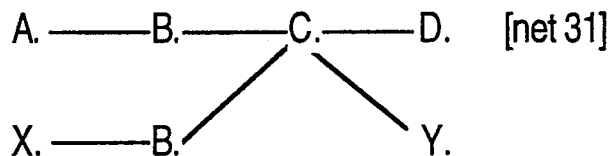
FIG. 20(c) AFTER MERGER
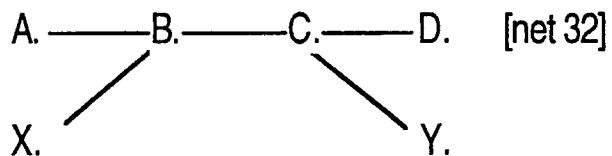
FIG. 21(a)
EXAMPLE OF INPUTTED CHARACTER STRING
A. K. I. T. A.
FIG. 21(b)
EXAMPLE OF NETWORK
A. —— K. —— I. —— T. —— A.

NETWORK REFORMER AND CREATOR

BACKGROUND OF THE INVENTION

Field of the Invention

This invention pertains to a network reformer and a network creator to which a rewriting rule is applied. They have the functions of separating a reforming target network to match an original before a rewriting, reforming a separated network per a rewriting rule, and merging a separated network.

For instance, a voice recognizer or a voice synthesizer customarily uses a network called an "acoustic segment network" or a "pronunciation network". A technique is sought for efficiently reforming or creating such a network. The following technical paper, for example, shows in detail the methods of using such a network in voice recognition and their effectiveness.

Shinta KIMURA, "100,000-Word Recognition Using Acoustic-Segment Networkers", IEEE, ICASSSP90 (1990 International Conference on Acoustic, Speech, and Signal Processing), pp. 61–64, April 1990.

DESCRIPTION OF THE RELATED ART

Recently, techniques have been developed for using acoustic segment networks, which express character strings such as words in pronunciation strings.

FIG. 1 explains a voice recognition system using an acoustic segment network.

First, an input voice 100 is inputted to an acoustic processor 101. The acoustic processor 101 identifies a pronunciation by matching the input voice 100 with the features of various sorts of pronunciations stored in an acoustic template 102 and converts the input voice 100 to a candidate string of pronunciations. The acoustic processor 101 supplies the candidate string for the pronunciation of the input voice 100 to a referencer 103. The referencer 103 recognizes this candidate string for the pronunciation of the input voice 100 as meaningful words by using an acoustic segment network 104 and a duration rule 105, and outputs a recognition result 106.

FIG. 2 shows an example of such an acoustic network.

Step C in FIG. 2 shows an acoustic segment network of a word "ASAHI", which in Japanese means "the rising sun".

The "#" sign indicates the beginning or end of a word. A network for connecting sound element data expresses the change of pronunciations in between. For instance, a path "#-A-S-A-Hi-#" and a path "#-A-S-u-A-H-I-#" both represent pronunciations of the word "ASAHI". This enables the different ways of pronunciations specific to individuals to be absorbed.

To use such an acoustic segment network in a voice recognition, a network for a word to be recognized, such as the one shown as section (c) in FIG. 2, needs to be created in advance. If the number of words to be recognized is small, it is possible to custom make acoustic segment networks for respective words to be recognized.

However, when generally used words are to be recognized, it is unrealistic to custom make all the acoustic segment networks. As such, it is conceived to automatically create an acoustic segment network, such as the one shown as section (c) in FIG. 2, by using a predetermined rewriting rule after converting a character string of an inputted word, such as the one shown as section (a) in FIG. 2, into a simple network, such as the one shown as section (b) in FIG. 2.

FIG. 3 shows a prior art example of a network conversion.

It is easy to apply a rewriting rule to a branchless network, such as [net 1] shown in section (a) in FIG. 3. Here, the "-" sign indicates a connection between two characters and does not have any meaning as a character by itself. Network [net 1] is equivalent to a character string comprising "Q.", "B. ", "C. ", "A." and "R.".

A rewriting rule can have only one [1] rewriting destination, such as [rule 1] and [rule 2], or have more than one [1] rewriting destination, such as [rule 3] and [rule 4]. Also, a rewriting rule can be independent of a context, such as [rule 1] and [rule 3], or dependent on a context, such as [rule 2] and [rule 4].

An application of rewriting rule [rule 1] (meaning converting a character "A." in a network to a character "B.") to network [net 1] produces a network [net 2].

As for rewriting rule [rule 2], the "/" sign indicates that the succeeding portion expresses the context, and the "." sign indicates the position of a pattern ("A." in this case) which is a reforming target. That is, rewriting rule [rule 2] means converting any "A." inserted between "C." and "R." to "B.". An application of rewriting rule [rule 2] to network [net 1] similarly produces network [net2]. However, when the last character of network [net 1] is an "S." instead of an "R.", an application of rewriting rule [rule 2] does not cause any rewriting, because the context is different.

Rewriting rule [rule 3] regards rewriting a character "A." to a character "B." and a character "C.". A rule, such as rewriting rule [rule 3], having more than one [1] rewriting possibility can form a branching network. For instance, an application of rewriting rule [rule 3] to network [net 1] produces a network [net 3].

Similarly, rewriting rule [rule 4] performs a rewriting like the above only when the context is also matched.

An application of a rule to a branching network such as network [net 3] is explained by referring to section (b) in FIG. 3.

A rewriting rule [rule 5] rewrites a connection between a "C." and a "B." to a "Z.". An application of rewriting rule [rule 5] to network [net 3] is supposed to produce a network [net 4]. However, a mere rewriting of a connection between a "C." and a "B." in network [net 3] to a "Z." can cause a branch connected to another "C." to lose a further connection, as shown in network [net 5]. Hence, this method does not allow a proper network to be obtained.

With the above background, a solution for this problem is proposed.

The problem of a branch losing a further connection, such as one shown in network [net 5], arises from a direct application of rewriting rule [rule 5] to a branching network. Hence, a solution is proposed whereby a branching network is split into a plurality of branchless networks, a rewriting rule is applied to the branchless networks, and the rewritten branchless networks are then rebuilt back to a single network.

An application of rule [rule 3] or [rule 4] shown in section (a) in FIG. 3 to network [net 1] produces network [net 3]. Network [net 3] is reconfigured as two [2] branchless networks [net 6] and [net 7] shown in section (c) in FIG. 3. An application of rewriting rule [rule 5] shown in section (b) in FIG. 3 causes network [net 6] to be reformed to a network [net 8]. Finally, networks [net 7] and [net 8] properly synthesize network [net 4] shown in section (b) in FIG. 3.

FIG. 4 illustrates a network synthesis.

One [1] means for synthesizing two [2] networks into one [1] is to examine the correspondences between the nodes of respective networks. A node refers to a minimum unit forming a network, such as an "A." or a "C.". A method utilizing a dynamic programming is proposed as a way of examining correspondences.

Section (a) in FIG. 4 shows the correspondences between networks [net 7] and [net 8], based on which the connections are rewritten by pairing the corresponding nodes. Section (b) in FIG. 4 shows the result, which is nothing but network [net 4] shown in section (b) in FIG. 3 as a targeted result.

However, the prior art method described above has several problems.

A case is considered in which the prior art method is applied to the following example.

FIG. 5 is a first diagram explaining a problem of the prior art method.

A case is considered where rewriting rules [rule 6], [rule 7] and [rule 8] are sequentially applied to network [net 9]. In this case, a network [net 10] is supposed to be obtained as a result. When the above described method is tried to create network [net 10], a branching network arises upon application of rewriting rule [rule 6]. Therefore, the branching network is split into two [2] branchless networks, rewriting rule [rule 7] being applied to one and rewriting rule [rule 8] being applied to the other. This produces two [2] branchless networks [net 11] and [net 12], which are then merged into one [1] synthetic branching network.

FIG. 6 is a second diagram explaining a problem of the prior art method.

Thus, the correspondences between networks [net 11] and [net 12] are examined, as shown in section (a) in FIG. 6. A merger of networks [net 11] and [net 12] produces a network [net 13] shown in FIG. 5. A comparison with the proper result, network [net 10], reveals that a path comprising "A.", "U.", "C.", "Z." and "E." and a path comprising "A.", "X.", "C.", "Y." and "E." are created additionally.

As described above, a mere application of a prior art method can produce a problem where a path that does not exist in reality is newly created. In a voice recognizer, if this occurs in generating an "acoustic segment network", the performance of the voice recognizer is deteriorated.

As a way of restraining the generation of such unnecessary paths, a method is easily conceived. When two [2] networks are merged, they are compared from their respective head ends and tail ends, such that only exactly the same nodes are merged. In other words, two [2] networks are merged as if they are squeezed from both ends.

A comparison of networks [net 11] and [net 12] from their respective ends for examining the correspondences of their nodes reveals that only "A."s at their head ends and "E."s at their tail ends are capable of being merged. This invalidates the correspondence between "C."s in the middle. Accordingly, networks [net 11] and [net 12] are merged per the correspondences shown in section (b) in FIG. 6, thus creating network [net 10] shown in FIG. 5.

However, this method is not without its own problem. An example is a case in which rewriting rule [rule 6] shown in FIG. 5 and rewriting rule [rule 9] shown in section (c) in FIG. 6 are applied to network [net 9] shown in FIG. 5. In this case, networks [net 14] through [net 17] shown in section (c) in FIG. 6 are created as intermediate results. They are then merged to create the targeted network.

Their appropriate merger should create network [net 13] shown in FIG. 5. However, when a solution based on the above described method is employed, a first merger between networks [net 14] and [net 15] creates a network [net 18] shown in section (d) in FIG. 6, a second merger between networks [net 18] and [net 16] creates a network [net 19] shown in section (e) in FIG. 6, and a third and final merger between networks [net 19] and [net 17] creates a network [net 20] shown in section (f) in FIG. 6.

As is evident from the comparison between networks [net 13] and [net 20], the above procedure causes network [net 20], equivalent to [net 13], to be very large. In other words, the network has become redundant. A network redundancy necessitates a voice recognizer have a larger memory capacity, thus deteriorating the processing speed.

Consequently, a use of the prior art method has a problem in that it may not produce an appropriate network and can invite a performance deterioration e.g. to a voice recognizer.

SUMMARY OF THE INVENTION

This invention aims at providing a network reformer and creator for efficiently creating a less redundant network, at reducing the memory capacity of an apparatus using a network and at ameliorating the processing speed.

This invention is premised on a network reformer for computerized reforming of a network in which basic units of data are connected per a predetermined rewriting rule and on a network creator for creating a network in which basic units of data are connected by applying a predetermined rewriting rule to an input character string.

The network reformer comprises an inputter for inputting a network which is a reforming target.

The network reformer then comprises a rule storer for storing a predetermined rewriting rule.

The network reformer further comprises a partial path separator for separating from the network a partial path matching a path in the source original before an application of the rewriting rule. The partial path separator comprises a normal directional path separator for separating a partial path sequentially from the head end node in the network and a reverse directional path separator for separating a partial path sequentially from the tail end node in the network.

The network reformer also comprises a partial path reformer for reforming a separated partial path per a rewriting rule.

In this invention, the above configuration can further provide in the network reformer a network merger for merging parts common between a reformed partial path and a remaining network after the partial path is separated. The network merger comprises a normal directional network merger for merging the common parts sequentially from the head end and a reverse directional network merger for merging the common parts sequentially from the tail end.

The network creator comprises a character string inputter for inputting a character string, which becomes a source of a network.

The network creator then comprises a network converter for converting an inputted character string to a network.

Also, the network creator shares the rule storer, the partial path separator and the network merger with the network reformer.

This invention with the above configuration makes a network an acoustic segment network registered in the dictionary used in voice recognition.

This invention enables an appropriate network having less redundancy to be efficiently created.

The reduction in the network redundancy realizes a cut in the memory capacity of an apparatus necessary in processing by using the created network, which in turn enables the processing speed to be improved.

BRIEF DESCRIPTION OF THE DRAWINGS

Those in the same field can easily understand additional objects and features of this invention from attached drawings and the description of the preferred embodiments. In the drawings:

FIGS. 2(b) and 2(c) show an example of such an acoustic network;

FIGS. 3(a), 3(b) and 3(c) show a prior art example of a network conversion;

FIGS. 4(a) and 4(b) illustrates a network synthesis;

FIG. 6(a), 6(b), 6(c), 6(d), 6(e) and 6(f) are second diagrams explaining a problem of the prior art method;

FIGS. 9(a) and 9(b) show a data structure of a rewriting rule used in a preferred embodiment;

FIGS. 12(a), 12(b) and 12(c) are diagrams for explaining a normal/reverse directional partial path separator;

FIGS. 13(a), 13(b) and 13(c) are diagrams for explaining a partial path separator;

FIGS. 20(a), 20(b) and 20(c) are explanatory charts of a network merger; and

FIGS. 21(a) and 21(b) are explanatory charts of a network converter in a network creator.

DESCRIPTION OF THE PREFERRED EMBODIMENTS

Explanation of the Principles

Figure 7A:
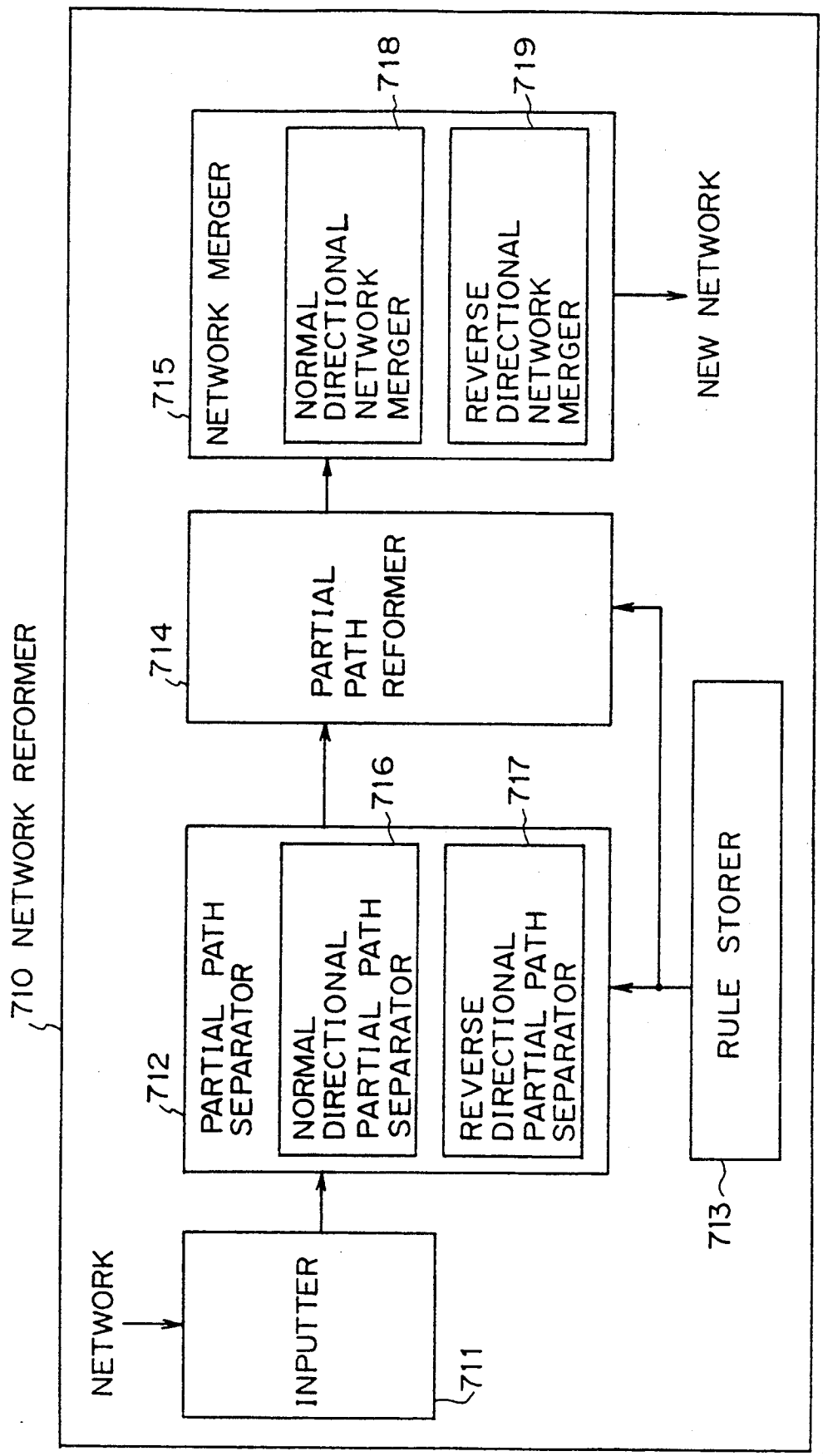
FIG. 7A is a block diagram of a network reformer.
Figure 7B:
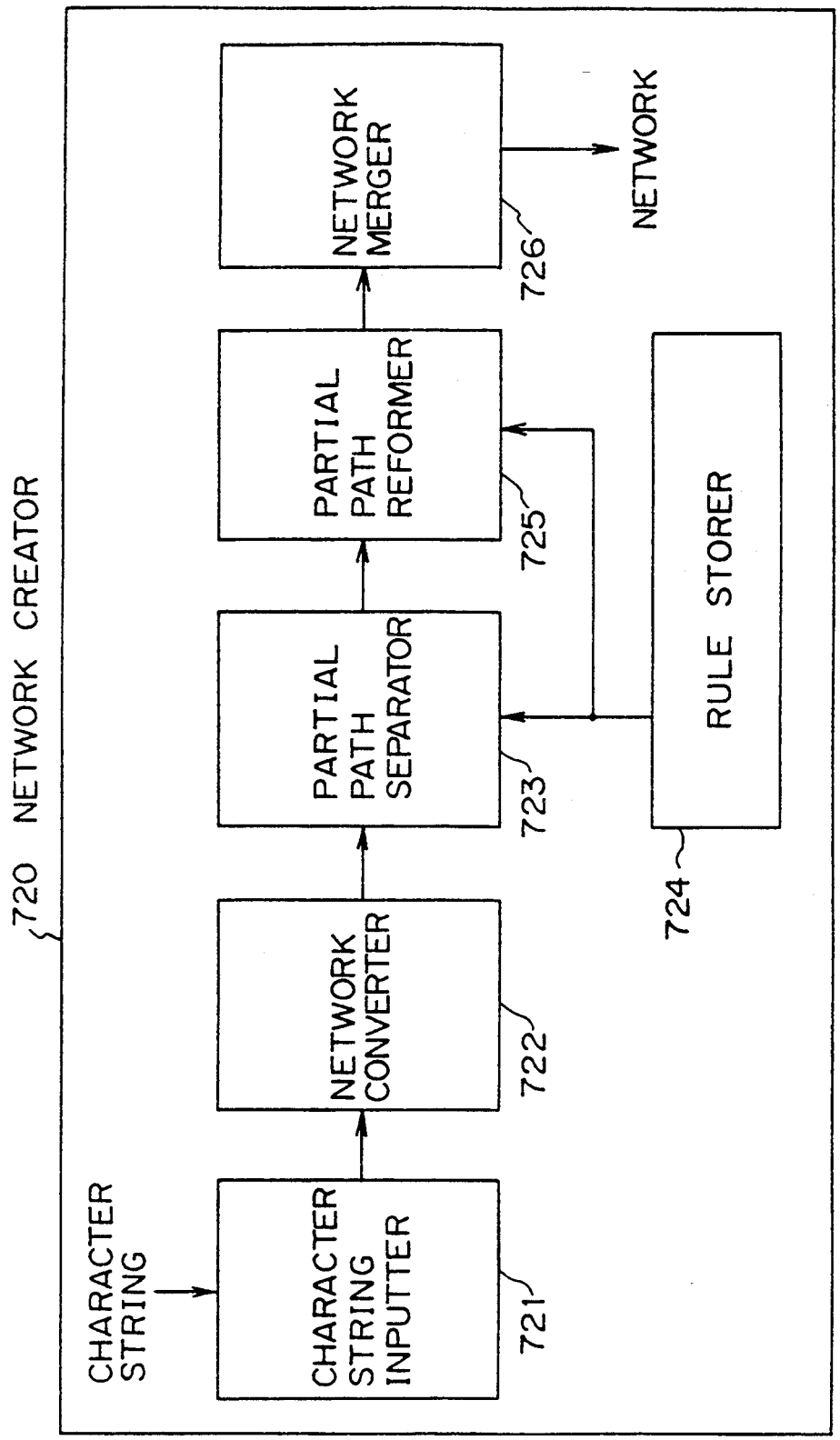
FIG. 7B is a block diagram of a network creator.

FIGS. 7A and 7B illustrate the principles of this invention.

More specifically, FIG. 7A is a block diagram of a network reformer, and FIG. 7B is a block diagram of a network creator.

A network reformer 710 shown in FIG. 7A comprises a CPU and a memory. It is an apparatus for reforming a network where basic units of data are connected into a targeted network per a predetermined rewriting rule. An inputter 711 inputs a network which is a reforming object. A rule storer 713 stores a rewriting rule for reforming a network.

A partial path separator 712 separates a partial path in the reforming target network inputted by the inputter 711 based on the rewriting rule stored in rule storer 713. That is, partial path separator 712 searches the reforming target network for extracting a partial path matching one in a rewriting source before a rewriting rule is applied. A partial path reformer 714 reforms a partial path separated by partial path separator 712 per the rewriting rule.

The network merger 715 merges a part common to both a partial path after being reformed by partial path reformer 714 and the remaining network after the partial path is separated, and outputs the merged result as a new network.

Partial path separator 712 comprises a normal directional partial path separator 716 for separating a partial path sequentially from the head end node of a network and a reverse directional partial path separator 717 for separating a partial path sequentially from the tail end node of a network, thereby separating a partial path matching one in the original source of a rewriting rule from the head end node and the tail end node.

A network merger 715 comprises a normal directional network merger 718 for merging the corresponding nodes between a partial path and its remaining path sequentially from the head end node of the network and a reverse directional network merger 719 for merging the corresponding nodes between a partial path and its remaining path sequentially from the tail end node of the network.

A network reformed by a rewriting rule has a structure such that basic units of data are connected by some form of a linking means such as a pointer and an identification number. This invention is applicable to any sort of data having this kind of structure. In particular, an application of this invention to creating and/or reforming an acoustic segment network registered in a dictionary used in voice recognition enables an efficient network to be obtained in terms of a memory capacity and a processing speed.

A network creator 720, shown in FIG. 7B, comprises a CPU and a memory. It receives a string of characters (including code data) which becomes a basic unit of data. It is an apparatus for creating a network per a predetermined rewriting rule from an inputted character string.

A network creator 720 comprises a character string inputter 721 as a means for inputting a character string which becomes a source of a network. A network converter 722 converts a character string inputted by the character string inputter 721 to data having a network structure showing the connections among respective characters. That is, the network creator 720 creates a network by connecting respective characters in an input character string.

A partial path separator 723, a rule storer 724, a partial path reformer 725 and a network merger 726 respectively, have the same functions as partial path separator 712, rule storer 713, partial path reformer 714 and network merger 715 shown in FIG. 7A. Whereas network reformer 710 shown in FIG. 7A reforms an inputted network, network reformer 720 shown in FIG. 7B in FIG. 7 receives a character string for creating a new network.

The operations of the configuration by those principles are explained below.

The network reformer 710 asks a user to input a network to the inputter 711. That is, the user inputs data on a network structure whose node is a basic unit of data (e.g. a pronunciation unit in case of an acoustic segment network in voice recognition). An inputter 711 aligns the data structure such that the inputted network structure can be controlled as data.

A rewriting rule is applied to an inputted network. Rule storer 713 stores the rewriting rule. Partial path separator 712 sequentially takes out a rule stored in rule storer 713, thereby judging whether or not the inputted network has any part matching the rewriting source of a rule. This judgment activates the normal directional partial path separator 716 for sequentially making judgments from the head end node and the reverse directional partial path separator 717 for sequentially making judgments from the tail end node.

When the inputted network has no part matching the rewriting source of the rule, searching for another rule continues. On the other hand, when the inputted network does have a part matching the rewriting source of the rule, partial path separator 712 separates the matched part from the network and sends the matched part and the other part to partial path reformer 714.

Partial path reformer 714 applies the matched rewriting rule to the separated partial path, thereby rewriting the partial path. Then, partial path reformer 714 sends to network merger 715 the partial path after being rewritten and the network supplied from partial path separator 712 after the partial path is separated.

Network merger 715 relates the partial path already rewritten to the network after the partial path is separated, and merges the partial path with the related network if they can be merged. At this time, the normal directional network merger 718 judges sequentially from the head end node of the network and the partial path whether or not nodes can be merged and executes their merger if the judgment is affirmative. Also at this time, the reverse directional network merger 719 judges sequentially from the tail end node of the network and the partial path whether or not nodes can be merged and executes their merger if a judgment is affirmative. Then, the normal directional network merger 718 and the reverse directional network merger 719 output to the user the already merged network as a new network.

As for the network creator 720, the user first inputs e.g. a character string which becomes a network source. The character string inputter 721 receives this and sends it to the network converter 722. The network converter 722 converts it into a network data structure. This equalizes the data of the network creator 720 such that it has the same network data structure as the inputter 711.

The subsequent processes performed by partial path separator 723, partial path reformer 725, and network merger 726 of the network creator 720 are essentially the same as those performed by partial path separator 712, partial path reformer 714, and network merger 715 of the network reformer 710. The network merged by the network merger 726 is outputted to the user as the appropriate network corresponding to the inputted character string.

Figure 1:
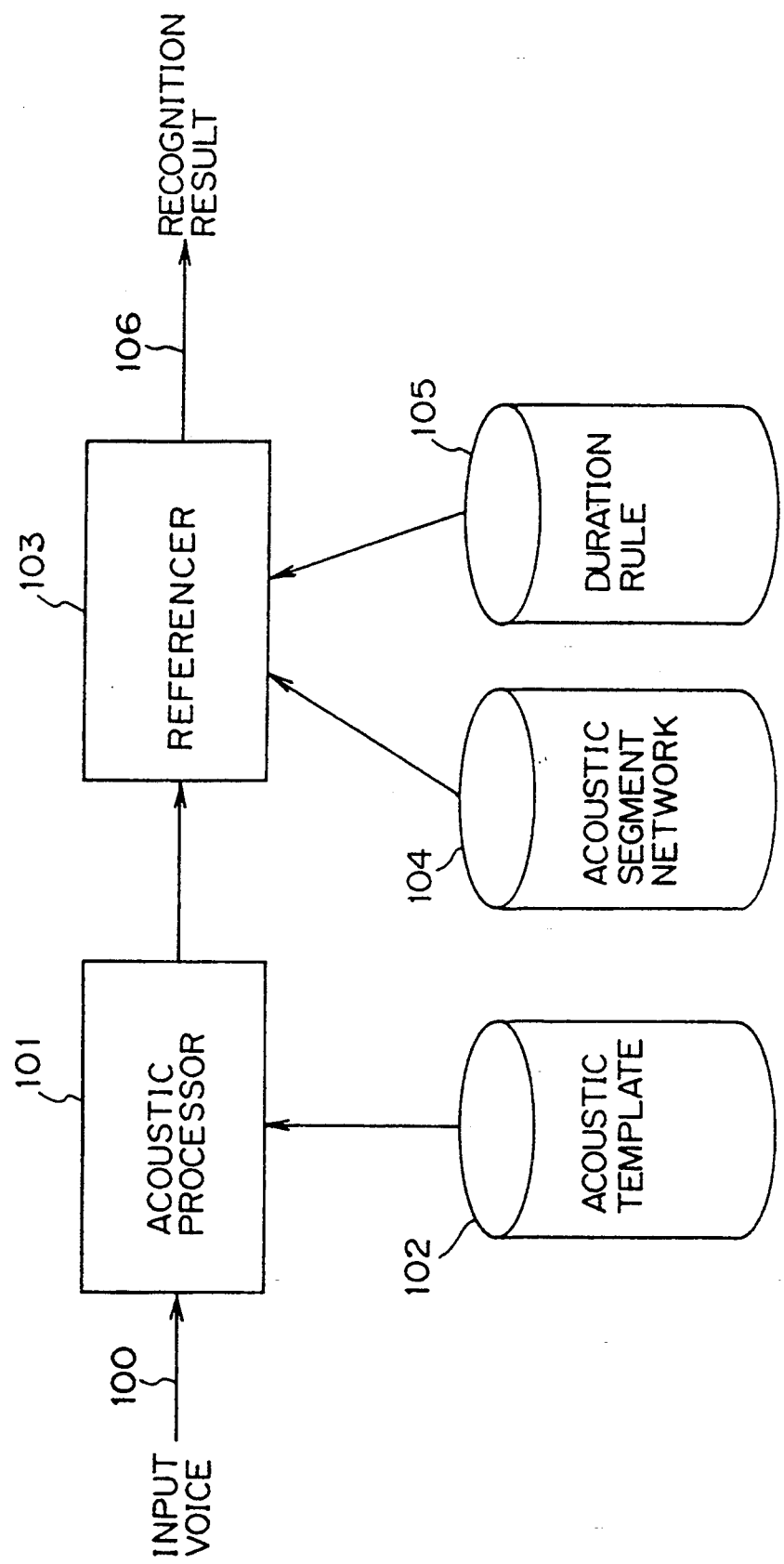
FIG. 1 explains a voice recognition system using an acoustic segment network.
Figure 5:
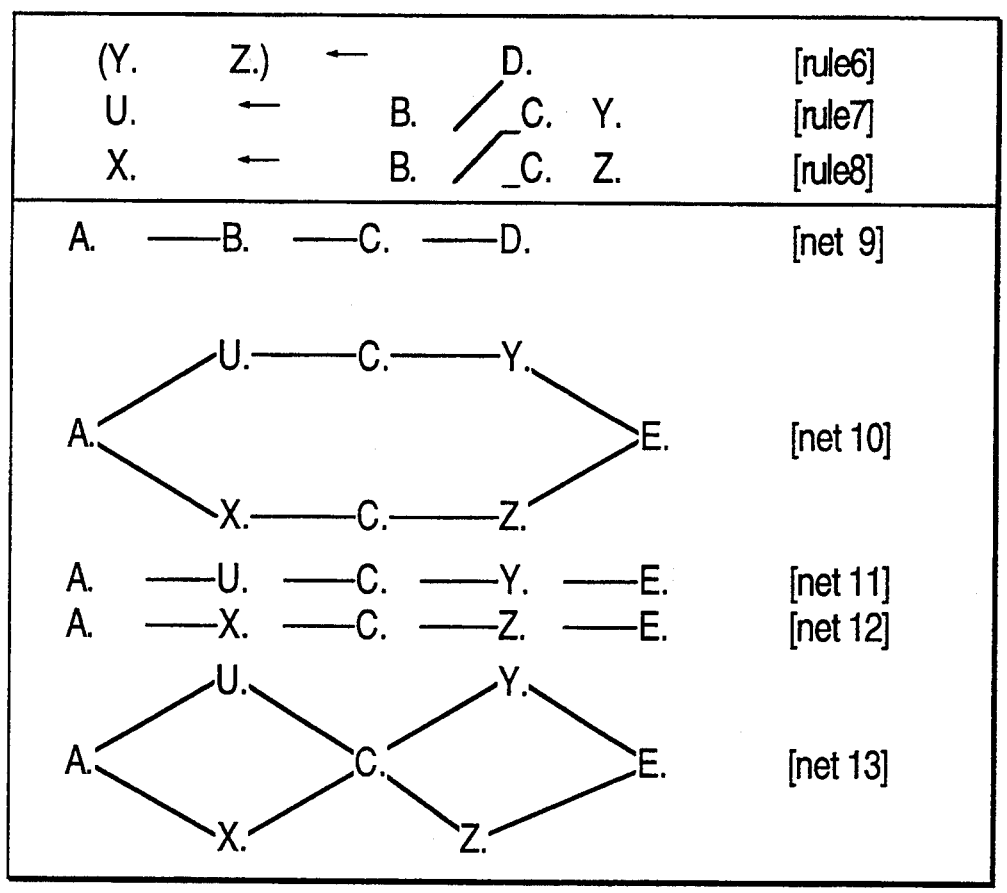
FIG. 5 is a first diagram explaining a problem of the prior art method.

The part merging a plurality of networks can generate unnecessary paths as shown in FIG. 5. Thus, this invention directly applies rules to a single network, which may have a branching, instead of using a prior art method of creating a single network by merging branchless networks. At this time, the reform target part reformed by a rewriting rule in a network is temporarily separated from the reform target network, and after the part is reformed, it is reunited with the original network.

The separation and reforming of the reform target part by a rewriting rule and the merger of the reform result with the remaining network prevent unnecessary paths from being generated and the reforming from being terminated in an insufficient state.

Explanation of Actual Embodiments

Actual embodiments of this invention are explained by referring to some of the attached drawings.

A first preferred embodiment of a network reformer is explained below. The network reformer applies a rewriting rule to an inputted network to obtain a new network.

Figures 8A, 8B:
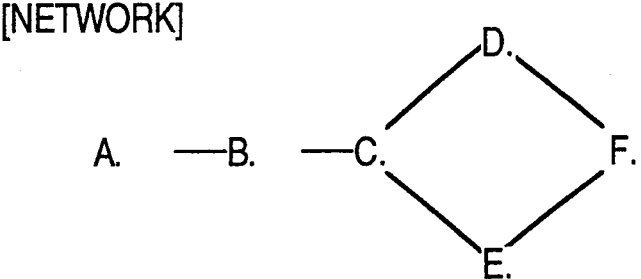
FIGS. 8(a) and 8(b) show a data structure of a network used in a preferred embodiment.

FIG. 8 shows a data structure of a network used in a preferred embodiment.

A user inputs a network such as one shown in section (a) in FIG. 8. The network reformer controls the network comprising connections of basic units of data (e.g. "A.", "B.", ... ) in a data structure, such as that shown in section (b) in FIG. 8. The data structure is for storing information on node names, the previous node number, and the next node number, in correspondence with the node numbers indicating respective node positions.

FIG. 9 shows a data structure of a rewriting rule used in a preferred embodiment.

More specifically, section (a) in FIG. 9 shows an example of a rewriting rule stored in rule storer 713 shown in FIG. 7A or in rule storer 724 shown in FIG. 7B. This example shows that the rewriting source is an "A.B./E..F." and that the rewriting target is a "C." and a "D.". This means that an "A.B." inserted between an "E." and an "F." are rewritten as a "C." and a "D.".

The network reformer controls such a rewriting rule in the data structure shown in section (b) in FIG. 9. That is, the network reformer stores an "A.B." as a {reform target pattern} and an "E.", and an "F." respectively as a {previous context} and a {next context}, and a "C." and a "D." as {post-reform patterns}. Generally, there are simpler forms of rules, but their data structures are the same.

Figure 10A:
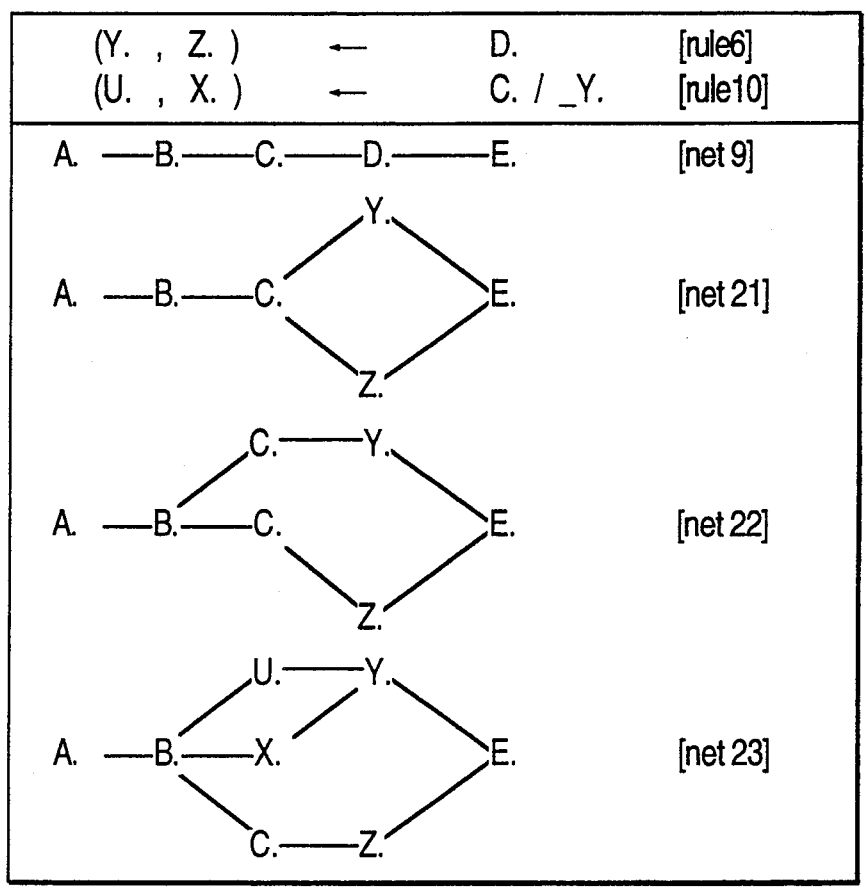
FIGS. 10(a) and 10(b) show a network reforming example in a preferred embodiment.
Figure 10B:
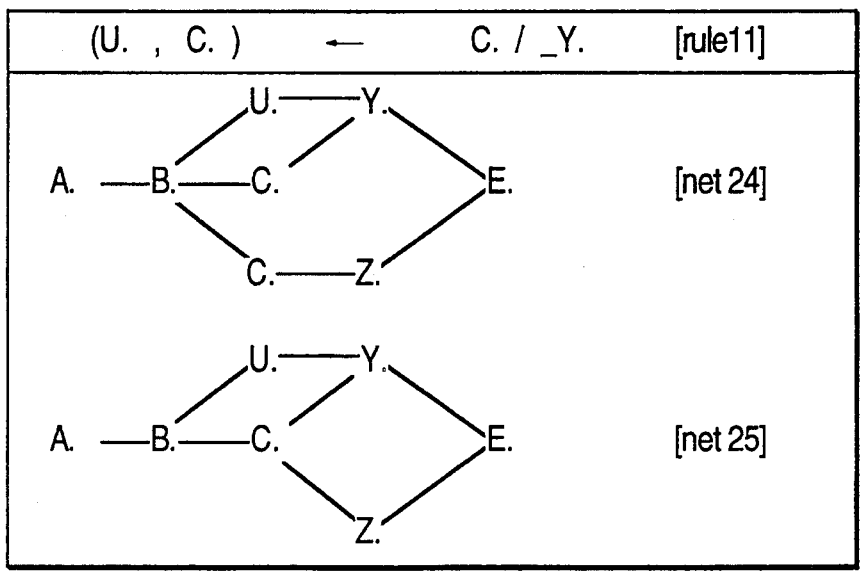

FIG. 10 shows a network reforming example in a preferred embodiment.

When network [net 9] shown in section (a) in FIG. 10 is reformed per a rewriting rule [rule 6], because a "D." is converted to a "Y." and a "Z.", a network [net 21] is obtained, which is further reformed by a rewriting rule [rule 10].

First, the inputter 711 shown in section (a) in FIG. 7 receives a network [net 21] and supplies it to partial path separator 712, which separates a partial path matching a rewriting rule from a network.

Because the "C.Y." in network [net 21] matches the source to be rewritten by rewriting rule [rule 10], the separation of those parts only will produce a network [net 22].

Then, partial path reformer 714 shown in section (a) in FIG. 7 receives network [net 22] and reforms it per rewriting rule [rule 10], which causes the "C." matching the "C.Y." to be reformed to a "U." and an "X." Because the partial path matching rewriting rule [rule 10] is already separated and is reformed to a branchless path, all the partial paths in the remaining part need to be replaced simply. The result is shown as a network [net 23].

An application to network [net 21] of a rewriting rule [rule 11] shown in section (b) in FIG. 10, instead of rewriting rule [rule 10] shown in section (a) in FIG. 10, produces a network [net 24]. Upon receiving network [net 24], network merger 715 shown in section (a) in FIG. 7 merges the nodes in a common part in network [net 24] together. Consequently, network merger 715 merges the common parts indicated by "C."s, thereby forming a network [net 25].

Figure 11:
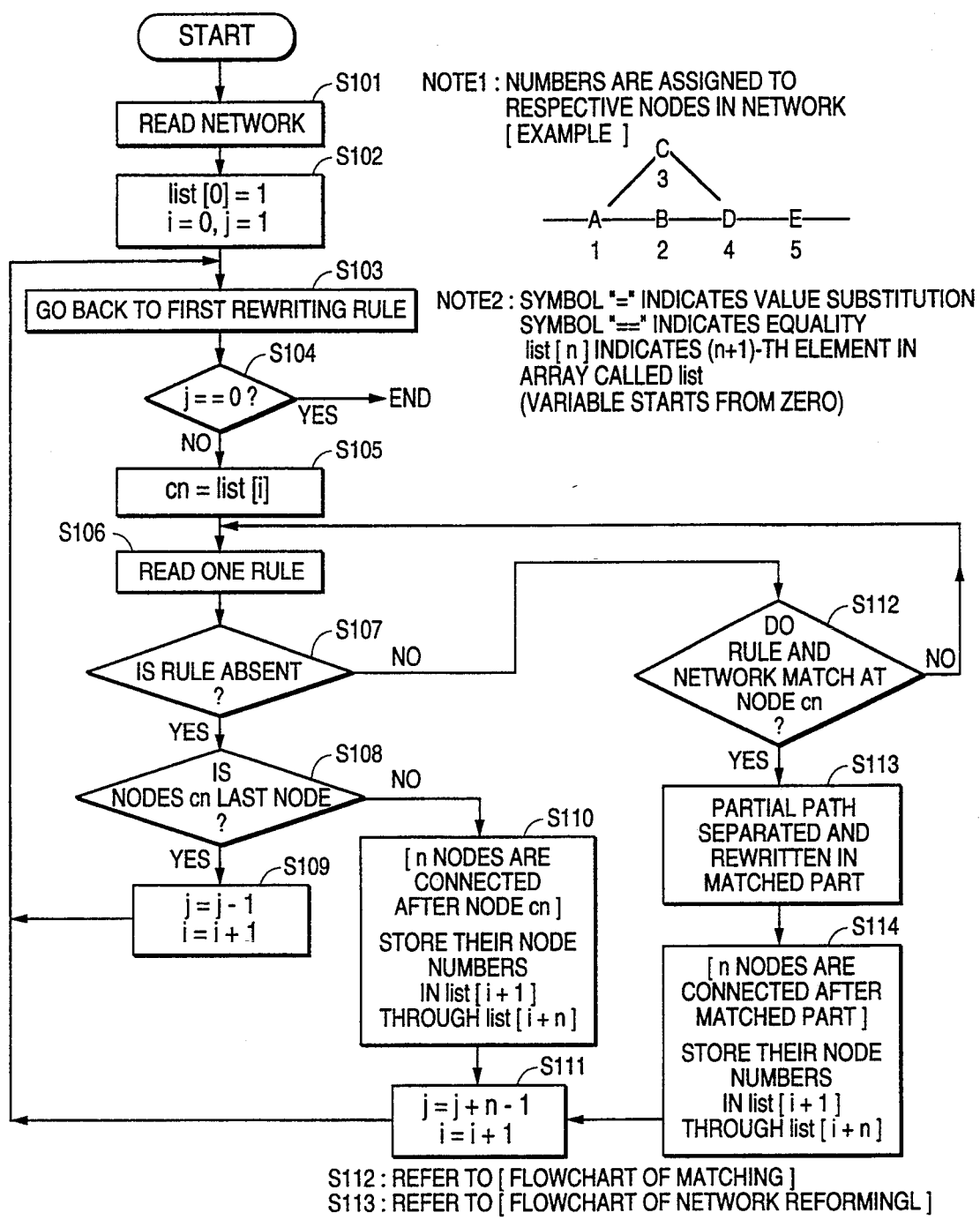
FIG. 11 is an operational flowchart of a network reformer in the preferred embodiment.

FIG. 11 is an operational flowchart of a network reformer in a preferred embodiment.

More specifically, FIG. 11 shows the flows performed by the network reformer 710 shown in section (a) in FIG. 7.

After the process starts, step S101 is invoked.

S101: First, the inputter 711 reads and controls a network, which a user inputs as data, e.g. having the data structure shown in section (b) in FIG. 8, comprising node numbers and node names, as well as previous and next contexts, which show preceding and succeeding connecting node numbers. The process continues to S102.

As indicated by NOTE 1 in FIG. 11, respective node names ("A.", "B.", "C.", "D." and "E.") correspond to node numbers (1, 2, 3, 4 and 5), and the preceding and succeeding node numbers of respective nodes are provided as input network data.

Partial path separator 712, partial path reformer 714 and rule storer 713 perform the following processes for reforming a network by applying a rewriting rule to an inputted network. More specifically, partial path separator 712 performs processes in S103 through S112, and partial path separator 712 and partial path reformer 714 perform S113.

S102: First, an initial value is set. That is, the initial value "list [i] (i=0)" of an array list expressing node numbers performing a matching with a rewriting rule is set to one [1], and j is set to one [1] (i.e. j=1). The process continues to S103.

S103: Partial path separator 712 sets a pointer to the head end of the referenced rewriting rules for matching a plurality of rewriting rules stored in rule storer 713 sequentially from the head end. The process continues to S104.

S104: Partial path separator 712 judges whether or not the value of "j" is zero [0]. If the judgment is affirmative (YES), the process ends. If the judgment is negative (NO), the process continues to S105.

S105: Partial path separator 712 substitutes the value of "list [i]" into a variable "cn" indicating the node number. The process continues to S106.

S106: Partial path separator 712 reads one [1]rewriting rule from rule storer 713. The process continues to S107.

S107: Partial path separator 712 judges whether or not any applicable rewriting rule is absent from rule storer 713. If the judgment is affirmative (YES), the process continues to S108. If the judgment is negative (NO), the process skips to S112.

S108: Partial path separator 712 judges whether or not node "cn" (the node whose node number is "cn") is the last node of the network. If the judgment is affirmative (YES), the process continues to S109. If the judgment is negative (NO), the process skips to S110.

S109: Partial path separator 712 decrements the value of j by one [1] and increments the value of i by one [1]. The process reverts to S103 in a loop form.

S110: Partial path separator 712 stores the node numbers of n nodes connected after node "cn", respectively in "list [i+1]", "list [i+2]", ... and "list [i+n]". The process continues to S111.

S111: Partial path separator 712 decrements the value of j by n minus one [n−1] and increments the value of i by one [1]. The process reverts to S103 in a loop form.

S112: Partial path separator 712 judges whether or not node name at node "cn" matches the description of the source before a rewriting rule is applied. If the judgment is affirmative (YES), the process continues to S113. If the judgment is negative (NO), the process reverts to S106.

S113: Partial path separator 712 and partial path reformer 714 rewrites the path in a matched part per a rewriting rule. The process continues to S114.

S114: The node numbers of n nodes connected after the matched part are respectively stored in "list [i+1]", "list [i+2]", ... and "list [i+n]". The process continues to S111.

Thus, the network reformer 710 has its inputter 711, partial path separator 712, rule storer 713 and partial path reformer 714 perform their processes per the above described steps in the operational flowchart shown as FIG. 11.

That is, references are made with the rewriting rules stored in rule storer 713 sequentially from the head end node, and a matched rewriting rule is searched. If there is a matched rewriting rule, it is executed. On the other hand, if there is no matched rewriting rule, similar processes are performed for the next node. Those processes are repeated to the last node.

Figure 16:
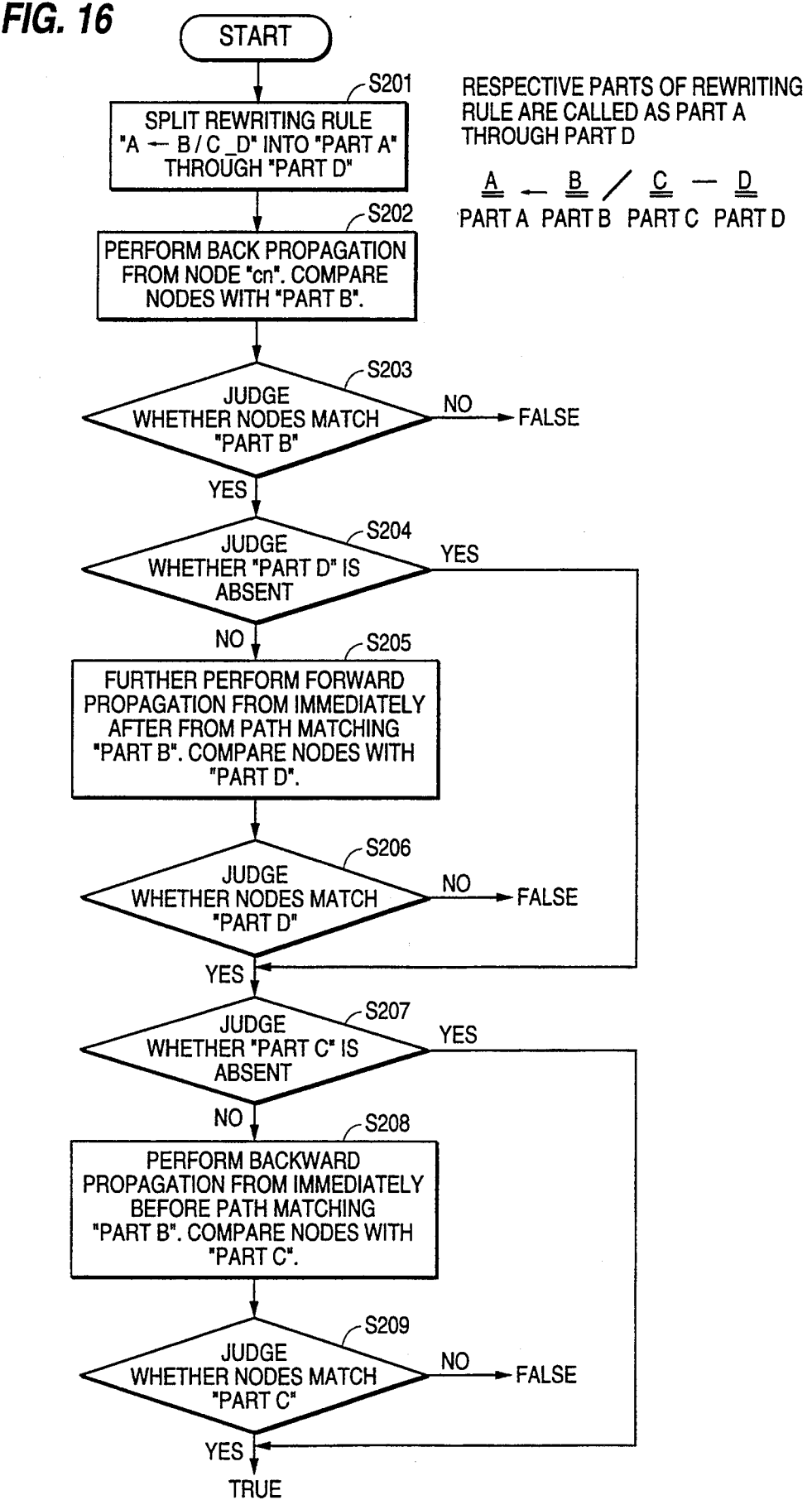
FIG. 16 is an operational flowchart of the matcher shown in FIG. 16.

Refer to FIG. 16 for further details of the actual operations in S112.

Figure 17:
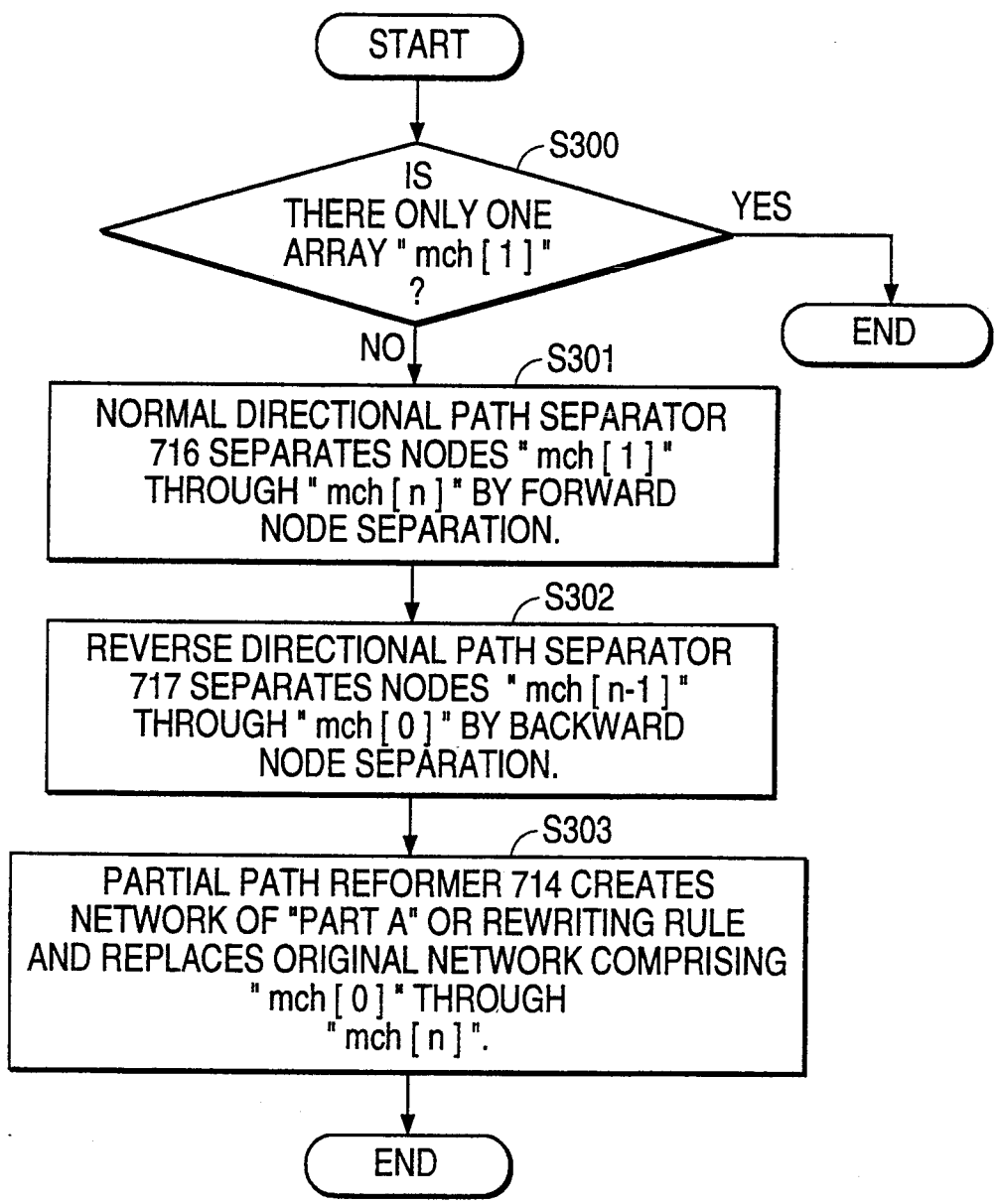
FIG. 17 is an operational flowchart for a partial path separation process and a rewriting process.

Refer to FIG. 17 for further detail of the actual operations in S113.

FIG. 12 is a diagram for explaining a normal/reverse directional partial path separator.

Partial path separator 712 described in the above processes comprises the normal directional partial path separator 716 and the reverse directional partial path separator 717. An exemplary case is described below in which a partial path "X.C.Z." is separated from network [net 13].

Partial paths are separated more appropriately by performing a forward separation and a backward separation in a split form. Although the sequence is not specifically defined here, a network [net 28] shows a result of performing a forward separation first.

A forward separation means that nodes "X.", "C." and "Z." on a path are examined sequentially from the head end. Branches sticking out to the left are separated into those which are parts of a partial path and those which are not, thereby expressing them respectively by different nodes.

FIG. 13 is a diagram for explaining a partial path separator.

More specifically, FIG. 13 illustrates the separation processes performed by partial path separator 712 or 723.

When a path comprising "X.B.C." is sequentially separated from a network [net 28] shown in section (a) in FIG. 13 in the normal direction, the processes undergo the changes shown in sections (b) and (c) in FIG. 13. That is, when a branching arises in the opposite direction (to the right) to the desired directions (to the left) as in a transition from a network [net 29] shown in section (b) in FIG. 13 to a network [net 30] shown in section (c) in FIG. 13, a branch to the right is copied to the both two [2]nodes separated from one [1].

A performance of such a separation for network [net 13] shown in section (a) in FIG. 12 results in a network [net 26] shown in section (b) in FIG. 12. A further performance of a backward separation results in a network [net 27]. Thus, the separations of the partial path comprising "X.C.Z." are completed.

Figure 14:
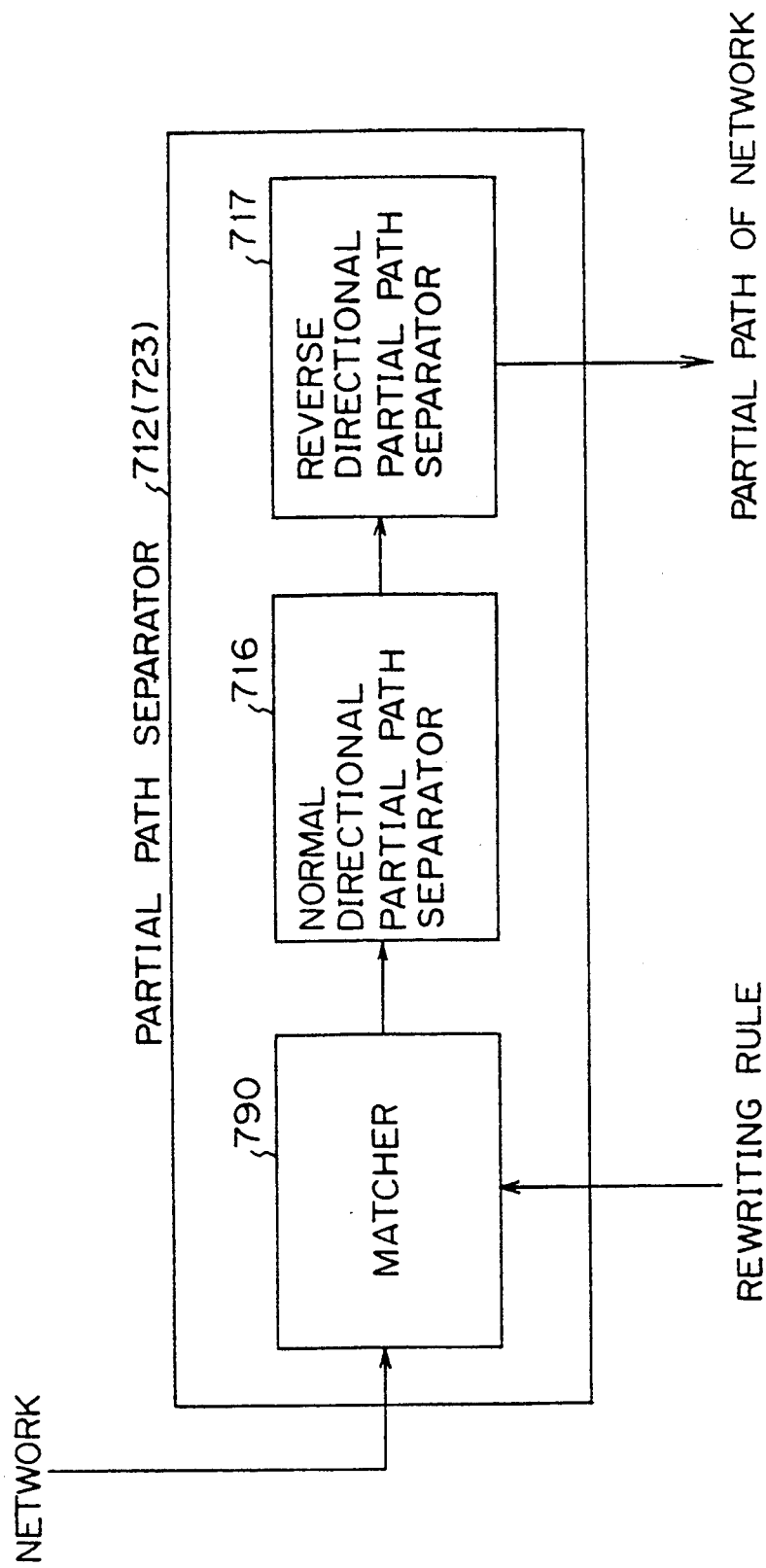
FIG. 14 shows a configuration of the partial path separator.

FIG. 14 shows a configuration of the partial path separator.

More specifically, FIG. 14 is a block diagram of partial path separator 712 or 723 used in the preferred embodiment of this invention shown in FIGS. 7A and 7B.

Partial path separator 712 or 723 comprises a matcher 790, as well as the normal directional path separator 716 and the reverse directional path separator 717 described earlier. The matcher 790 extracts the parts to which a rewriting rule is applicable from a network. Then, the normal directional path separator 716 and the reverse directional path separator 717 respectively separate partial paths in the normal and reverse directions from the extracted parts.

Figure 15:
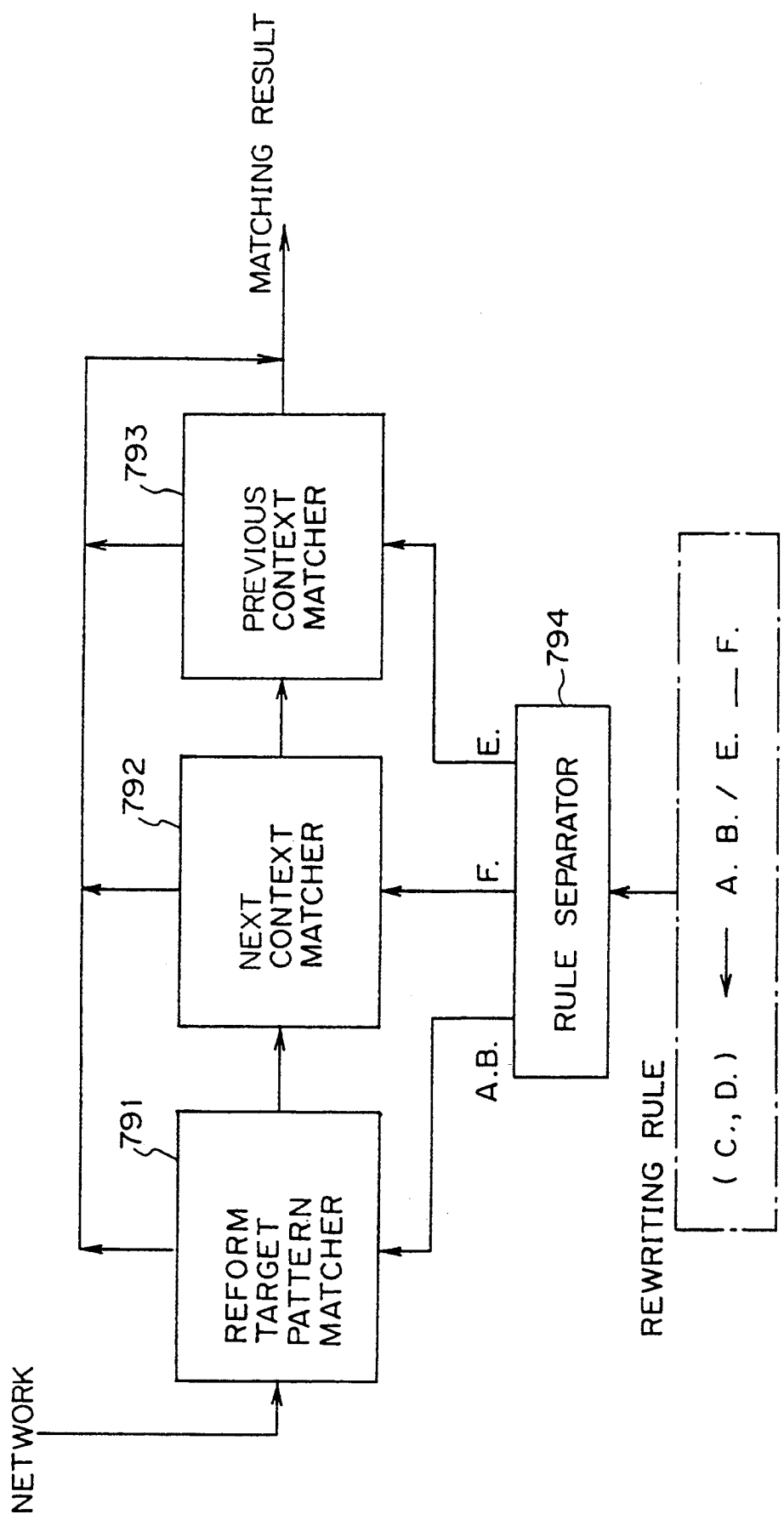
FIG. 15 shows a configuration of a matcher.

FIG. 15 shows a configuration of a matcher.

More specifically, FIG. 15 is a block diagram of the matcher 790 in partial path separator 712 or 723. A reform target pattern matcher 791 examines whether or not a reform target pattern matches a rewriting rule. The rewriting rule used here has the earlier described structure shown in section (b) in FIG. 9. The reform target pattern matcher 791 supplies a reform target pattern matching a rewriting rule to a next context matcher 792 in the next stage. A matching is deemed to be a failure, if a reform target pattern does not match any rewriting rule. The reform target pattern matcher 791 outputs the failure as a matching result by skipping all subsequent stages.

Similarly, the next context matcher 792 and a previous context matcher 793 examine whether or not the {next context} and the {previous context} match a rewriting rule. If the reform target pattern matcher 791, the next context matcher 792 and the previous context matcher 793 all find their respective matches with a rewriting rule, the matcher 790 outputs the network and the number of the matched node. If any one of them does not find a match, the process stops at that point and the matcher 790 outputs the failure as a matching result.

A rule separator 794 shown in FIG. 15 splits a rewriting rule into a reform target pattern, a {next context} and a {previous context}, and supplies them to the reform target pattern matcher 791, the next context matcher 792 and the previous context matcher 793 in respective stages. When a rewriting rule is "(C.,D.)←A.B./E..F.", for instance, the rule separator 794 splits this rewriting rule and supplies an "A.B." to the reform target pattern matcher 791, an "F." to the next context matcher 792, and an "E." to the previous context matcher 793.

FIG. 16 is an operational flowchart of the matcher shown in FIG. 15.

More specifically, FIG. 16 describes in detail the steps of operations executed by the matcher 790 in partial path separator 712 of the network reformer 710 for performing S112 in the operational flows of the network reformer 710 shown in FIG. 11.

A negative judgment in S107 shown in FIG. 11 causes the current processes in S112 to start, which invokes S201.

S201: The rule separator 794 in the matcher 790 splits a rewriting rule into parts A through D to be supplied to the reform target pattern matcher 791. A "part" comprises a row of more than zero nodes. For example, the rule separator 794 splits a rewriting rule "A←B/C.D" into a rewriting source "part B", a {previous context} "part C", a {next context} "part D" and a rewriting target "part A". The process continues to S202.

S202: The reform target pattern matcher 791 performs a back propagation from a node "cn" through a network to sequentially compare respective nodes with the rewriting source "part B" The process continues to S203.

S203: If the reform target pattern matcher 791 detects a match (YES), the process continues to S204; otherwise (NO), the matcher 790 terminates the current processes by outputting a matching result indicating a failure [FALSE] and the process continues to the matching of the next rewriting rule (S106 shown in FIG. 11).

S204: The next context matcher 792 judges whether or not a next context ("D." in this case) is absent. If the judgment is affirmative (YES), the process skips to S207. If the judgment is negative (NO), the process continues to S205.

S205: The reform target pattern matcher 791 further performs a forward propagation from immediately after the node in the path matching the rewriting source "part B" through the network to sequentially compare respective nodes with the next context "part D". The process continues to S206.

S206: The next context matcher 792 judges whether or not the next context ("part D" in this case) matches a node. If the judgment is affirmative (YES), the process continues to S207. If the judgment is negative (NO), the matcher 790 terminates the current processes by outputting a matching result indicating a failure [FALSE] and the process continues to the matching of the next rewriting rule (S106 shown in FIG. 11).

S207: The previous context matcher 793 judges whether or not a {previous context} ("part C" in this case) is absent. If the judgment is affirmative (YES), the process ends, and the matcher 790 terminates the current processes by outputting a matching result indicating a success [TRUE] and the process continues to partial path separation and rewriting of the matched part (S113 shown in FIG. 11). If the judgment is negative (NO), the process continues to S208.

S208: The reform target pattern matcher 791 performs a propagation from immediately before the node in the path matching the {previous context} "part B" through the network to sequentially compare respective nodes with the {previous context} "part C". The process continues to S209.

S209: The previous context matcher 793 judges whether or not the {previous context} ("part C" in this case) matches a node. If the judgment is affirmative (YES), the process ends, and the matcher 790 terminates the current processes by outputting a matching result indicating a success [TRUE] and the process continues to partial path separation and rewriting of the matched part (S113 shown in FIG. 11). If the judgment is negative (NO), the matcher 790 terminates the current processes by outputting a matching result indicating a failure [FALSE] and the process continues to the matching of the next rewriting rule (S106 shown in FIG. 11).

The algorithms of respective elements (i.e. the reform target pattern matcher 791, the next context matcher 792, the previous context matcher 793 and the rule separator 794) of the matcher 790 shown in FIG. 16 are explained below in further detail.

[The rule separator 794]

A1: Read a rewriting rule from rule storer 713. When all rules are read, the process is completed. Continue to step A2.

A2: Send to a reform pattern matcher 791 contents of a {reform target pattern} from among rewriting rules shown in FIG. 9. Continue to step A3.

A3: Send a {next context}, if any, or a void character string to the next context matcher 792. Continue to step A4.

A4: Send a {previous context}, if any, or a void character string to the previous context matcher 793. Continue to step A4.

A5: End if all three [3] matchers described in steps A2, A3 and A4, (i.e. the reform target pattern matcher 791, the next context matcher 792, the previous context matcher 793 and the rule separator 794) of the matcher 790 shown in FIG. 16 succeed in their matchings, otherwise revert to step A1.

[The reform pattern matcher 791]

B1: Read a {reform target pattern} from a rule separator 794, and store it in an array "PAT [i]". For instance, when the "reform target pattern" is "A.B.", store "A." in "PAT [0]" and "B." in "PAT [1]". Continue to step B2.

B2: Substitute zero [0] into a variable "i" and store the length of the arrays "PAT" (two [2] in this example) in a variable "len". Continue to step B3.

B3: Store the node number of a {current position} of a network in a variable "n". Continue to step B4.

B4: Compare the node name of a node "n" in a network with "PAT [i]". Output "FALSE" and end, if they don't match. Proceed to step B5, if they match.

B5: Increment the value of variable "i" by one [1]. Continue to step B6.

B6: Output "TRUE" and end, if the value of variable "i" is equal to the value of variable "len". Proceed to step B7, otherwise.

B7: Output "FALSE" and end, if the value of a {next node} in the network is the same as the current value of "n". Proceed to step B8, if more than one [1]value of the {next node} exists.

B8: Substitute the value of the {next node} of the network into "n". Do the same sequentially (and independently), if the {next node} registers more than one [1] value. Revert to B3.

[The next context matcher 792]

C1: Read a {next context} from a rule separator 794, and store it in array "PAT [i]". For instance, when the "next context pattern" is "A.B.", store "B." in "PAT [0]" and "A." in "PAT [1]". Continue to step D2.

C2: Substitute zero [0] into a variable "i" and store the length of the arrays "PAT" (two [2] in this example) in a variable "len". Continue to step C3.

C3: Store the number of the {next node} of a {current position} of a network in a variable "n". Do the same sequentially (and independently), if more than one [1] {next node} number exists. Continue to step C4.

C4: Compare the node name of a node "n" in a network with "PAT [i]". Output "FALSE" and end, if they don't match. Proceed to step C5, if they match.

C5: Increment the value of variable "i" by one [1]. Continue to step C6.

C6: Output "TRUE" and end, if the value of variable "i" is equal to the value of variable "len". Proceed to step C7, otherwise.

C7: Output "FALSE" and end, if the value of a {next node} in the network is the same as the current value of "n". Proceed to step C8, if more than one [1]value of the {next node} exists.

C8: Substitute the value of the {next node} of the network into "n". Do the same sequentially (and independently), if the {next node} registers more than one [1] value. Revert to step C3.

[The previous context matcher 793]

D1: Read a {previous context} from a rule separator 794, and store it in array "PAT [i]". Then, invert the sequence of the contents of array "PAT [i]". For instance, when the "previous context pattern" is "A.B.", store "B." in "PAT [0]" and "A." in "PAT [1]". Continue to step D2.

D2: Substitute zero [0] into a variable "i" and store the length of the arrays "PAT" (two [2] in this example) in a variable "len". Continue to step D3.

D3: Store the number of the {previous node} of a {current position} of a network in a variable "n". Do the same sequentially (and independently), if more than one [1] {previous node} number exists. Continue to step D4.

D4: Compare the node name of a node "n" in a network with "PAT [i]". Output "FALSE" and end, if they don't match. Proceed to step D5, if they match.

D5: Increment the value of variable "i" by one [1]. Continue to step D6.

D6: Output "TRUE" and end, if the value of variable "i" is equal to the value of variable "len". Proceed to step D7, otherwise.

D7: Output "FALSE" and end, if the value of a {previous node} in the network is the same as the current value of "n". Proceed to step D8, if more than one [1] value of the {previous node} exists.

D8: Substitute the value of the {previous node} of the network into "n". Do the same sequentially (and independently), if the {previous node} registers more than one [1] value. Revert to step D3.

FIG. 17 is an operational flowchart for a partial path separation process and a rewriting process.

More specifically, FIG. 17 describes in detail the steps of operations executed by the normal directional path separator 716 and the reverse directional path separator 717 in partial path separator 712 of the network reformer 710 for performing S113 in the operational flows of the network reformer 710 shown in FIG. 11.

An affirmative judgment in S112 shown in FIG. 11 causes the current processes in S113 to start, which invokes S300.

When the matcher 790 can match a partial path with a rewriting rule, the normal directional partial path separator 716 and the reverse directional partial path separator 717 separate the partial path. Then, the partial path reformer 714 reforms the separated partial path per the rewriting rule. More concretely, the partial path reformer 714 replaces the part in the separated partial path matching the reform target pattern with the pattern described in the {post-reform patterns}.

Arrays "mch [0]" through "mch [n]" store the node numbers matching a rewriting rule in the matching processes shown in FIG. 16.

An affirmative judgment in S112 shown in FIG. 11 causes the current processes in S113 to start, which invokes S300.

S300: Partial path separator 712 judges whether or not the number of matched nodes is one [1]. If the judgment is affirmative (YES), the process ends, because the node need not be separated. If the judgment is negative (NO), i.e., if there are two [2]or more matched nodes, the process continues to S301.

S301: The normal directional path separator 716 separates matched nodes connected forward from the head end node "mch [0]", i.e. arrays "mch [1]" through "mch [n]", as a forward node separation, which will be elaborated later. The process continues to S302.

S302: The reverse directional path separator 717 separates matched nodes connected backward from the tail end node "mch [n]", i.e. arrays "mch [n−1]" through "mch [0]", as a backward node separation, which will be elaborated later. The process continues to S303.

S303: After the forward and backward node separations, the partial path reformer 714 creates the network of the rewriting target "A." by a rewriting rule, and replaces the original network comprising arrays "mch [0]" through "mch [n]" of matched nodes. The process ends, thus terminating all processes in S113 and S114 shown in FIG. 11 is initiated.

Figure 18A:
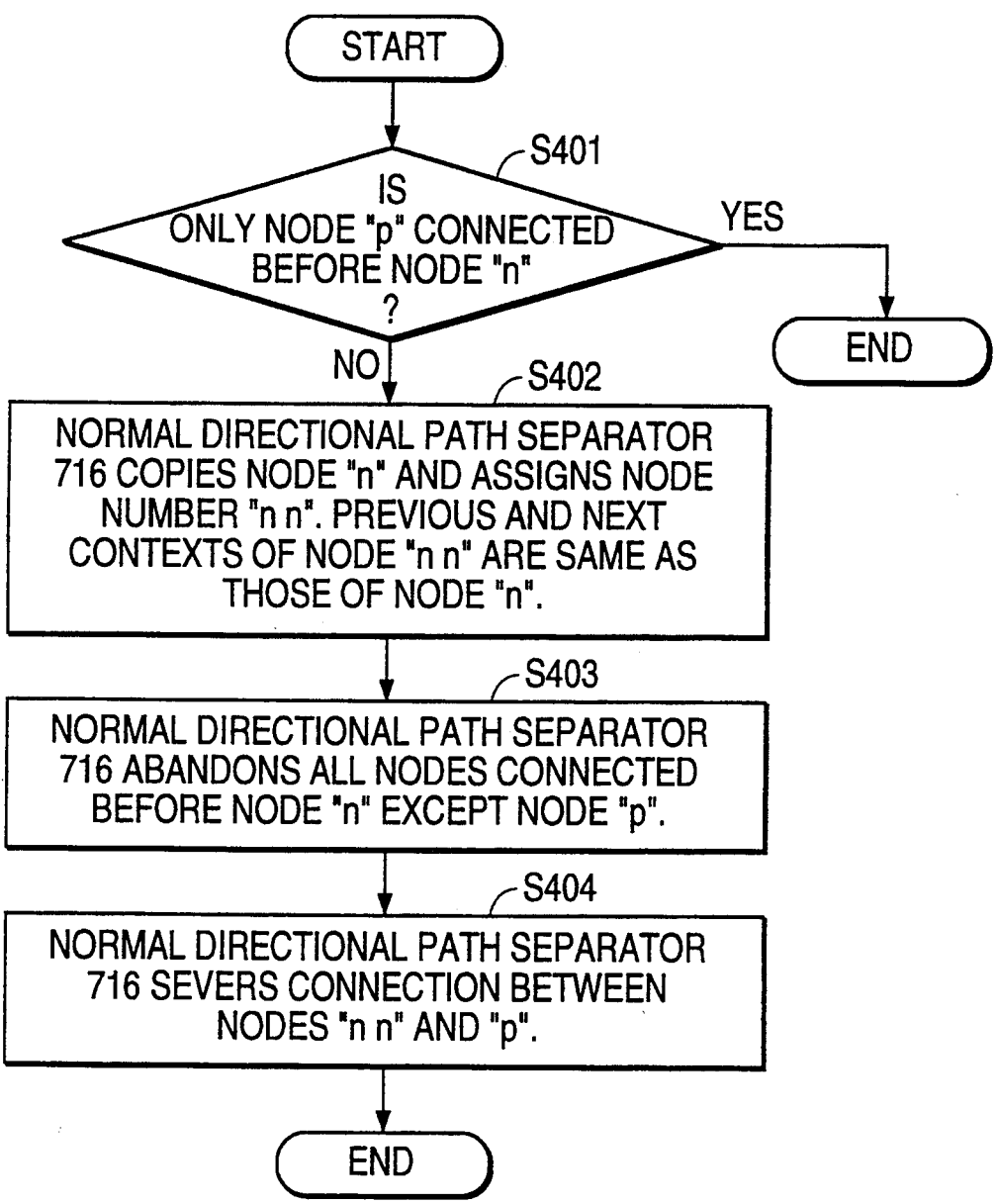
FIG. 18A is an operational flowchart of a normal directional (forward) node separation.

Refer to FIG. 18A for further detail of the actual operations in S301.

Figure 19A:
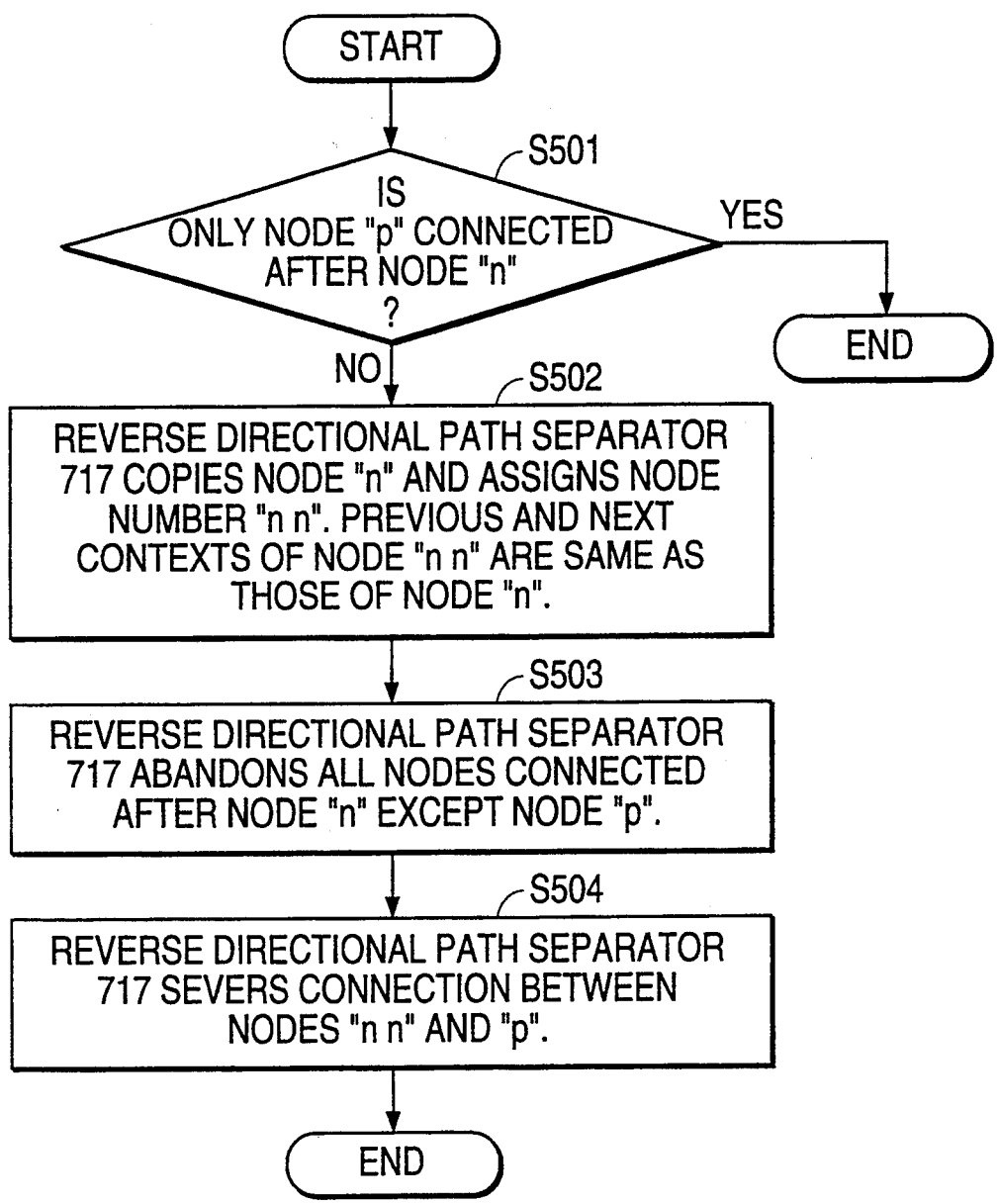
FIG. 19A is an operational flowchart of a reverse directional (backward) node separation.

Refer to FIG. 19A for further detail of the actual operations in S302.

FIG. 18A is an operational flowchart of a normal directional (forward) node separation.

Figure 18B:
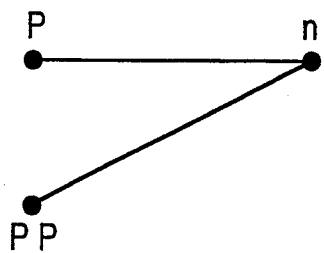
FIGS. 18B(a)–18B(f) show an explanatory view of the nodes subjected to the normal direction node separation.
Figure 18B:
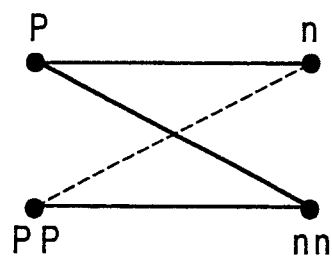
Figure 18B:
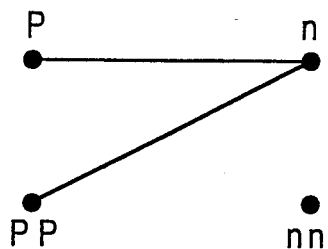
Figure 18B:
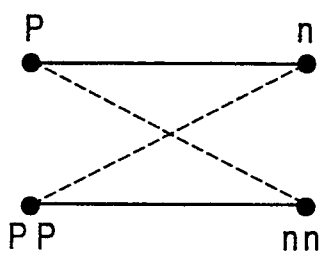
Figure 18B:
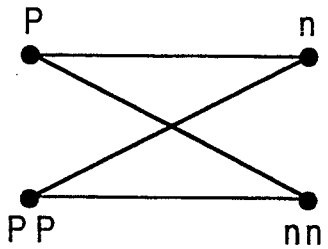
Figure 18B:
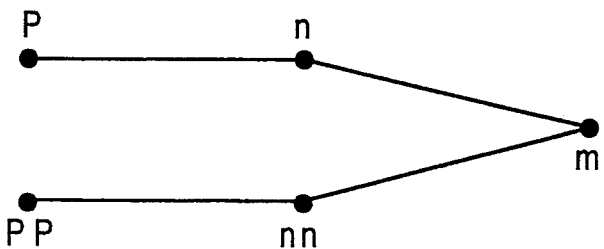

FIG. 18B shows changes in normal directional (forward) node connections.

More specifically, FIG. 18A describes in detail the forward node separation performed by the normal directional path separator 716, which is designated as S301 in FIG. 17. Assume here that "mch [i]" represents a separated node, a node "n" is "mch [i]", and a node "nn" is "mch [i−1]". That is, n=mch [i] and nn=mch [i−1].

An execution of S300 shown in FIG. 17 causes the processes shown in FIG. 18 to start, which invokes S401.

S401: The normal directional path separator 716 judges whether only node "p" is connected forward to node "n" or something else is also connected forward to node "n". If the judgment is affirmative (YES), the process ends, thus terminating all processes of the forward node separation, and the backward node separation in S302 is invoked. If the judgment is negative (NO), the process continues to S402, which is explained by referring to FIG. 18B.

S402: Section (a) in FIG. 18B shows a case where node "n" forward connects a node "pp", in addition to node "p". The normal directional path separator 716 copies node "n" and assigns a node number "nn" to the copy, as shown in section (b) in FIG. 18B. Node "nn" has the same forward and backward contexts as node "n", as shown in section (c) in FIG. 18B. This causes another set of partial paths ("p" - "nn" and "pp" - "nn") having the same forward and backward contexts as the set of partial paths ("p" - "n" and "pp" - "n") of node "n" to be created. The process continues to S403.

S403: The normal directional path separator 716 abandons all nodes connected forward of node "n" except only forward connected node "p". That is, partial path ("pp" - "n") is discarded, as shown in section (d) in FIG. 18B. The process continues to S404.

S404: The normal directional path separator 716 severs the connection between node "nn" and node "p", as shown in section (e) in FIG. 18B. This creates a new node "nn" which has a connection to node "m" as node "n" has which has and the matched partial path to be completely separated, as shown in section (f) in FIG. 18B. The process ends, thus terminating all processes of the normal direction node separation, and the backward node separation in S302 is invoked.

The algorithm performed for the forward node separation illustrated in FIGS. 18A and 18B is as follows:

S4001: If the degree of a branch connected before a node is greater than one [1], i.e. if a node has a plurality of previous branches, of all the previous branches matching a rewriting rule is separated of all the previous branches. This allows the current node to be separated into previous branches corresponding to the number of previous nodes matching the rewriting rule.

S4002: Set the destination of the next branch of a separated node the same as the current node.

The following is a more concrete description of the normal directional partial path separator 716 shown in FIG. 14.

[The normal directional partial path separator 716]

E1: Store the node number of the part in the network matching a rewriting rule in an array "MATCH [i]". Continue to step E2.

E2: Substitute one [1] into variable "i" and the length of arrays "MATCH" into variable "len". Continue to step E3.

E3: End if the value of variable "i" is equal to that of variable "len", and continue to step E4 otherwise.

E4: Substitute "MATCH [i−1]" into variable "pn" and "MATCH [i]" into variable "cn". Continue to step E5.

E5: Split node "cn" in the network by performing a "normal directional node separation". Revert to step E3.

The "normal directional node separation" is performed in the following procedures:

E5-1: Create a new node and assign "nn" to its node number. Continue to step E5-2.

E5-2: Copy the node name of node "cn" to node "nn". Continue to step E5-3.

E5-3: Store "pn" in the {previous node} of node "nn" and add "nn" to the {next node} of node "pn". Continue to step E5-4.

E5-4: Copy the {next node} of node "cn" to node "nn". Continue to step E5-5.

E5-5: Add "nn" to {previous node} to each node described as the {next node} of node "cn". Continue to step E5-6.

E5-6: Eliminate "pn" from the {previous node} of node "cn". Continue to step E5-7.

E5-7: Eliminate "cn" from the {next node} of node "pn". End.

FIG. 19A is an operational flowchart of a reverse directional (backward) node separation.

Figure 19B:
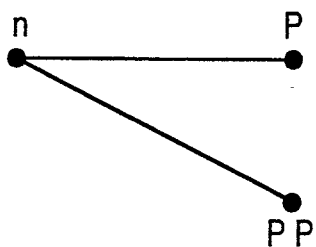
FIG. 19B(a)–19B(f) show an explanatory view of the nodes subjected to the reverse direction node separtion.
Figure 19B:
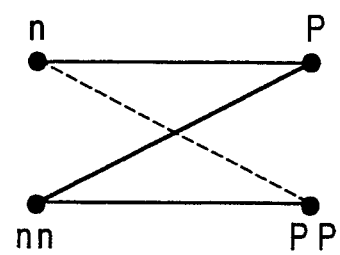
Figure 19B:
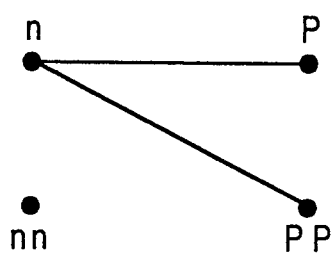
Figure 19B:
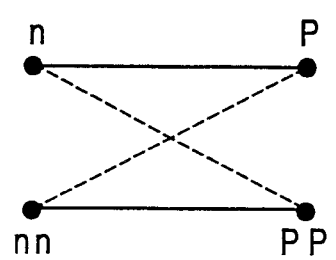
Figure 19B:
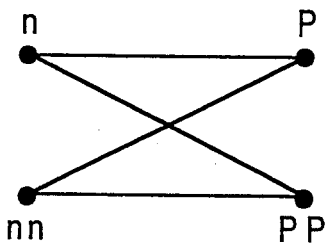
Figure 19B:
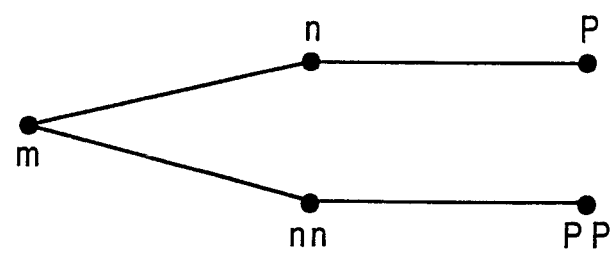

FIG. 19B shows changes in reverse directional (backward) node separations.

More specifically, FIG. 19A describes in detail the backward node separation performed by the reverse directional path separator 717, which is designated as S302 in FIG. 17. Assume here that "mch [i]" represents a separated node, a node "n" is "mch [i]", and a node "nn" is "mch [i+1]". That is, n=mch [i] and nn=mch [i+1].

An execution of S301 shown in FIG. 17 causes the processes shown in FIG. 18 to start, which invokes S501.

S501: The reverse directional path separator 717 judges whether only node "p" is connected after node "n" or something else is also connected after node "n". If the judgment is affirmative (YES), the process ends, thus terminating all processes of the reverse directional node separation, and the network reforming in S303 is invoked. If the judgment is negative (NO), the process continues to S502, which is explained by referring to FIG. 19B.

S502: Section (a) in FIG. 19B shows a case where node "n" connects a node "pp", in addition to node "p" after the node "n". The reverse directional path separator 717 copies node "n" and assigns a node number "nn" to the copy, as shown in section (b) in FIG. 19B. Node "nn" has the same forward and backward contexts as node "n", as shown in section (c) in FIG. 19B. This causes another set of partial paths ("nn" - "p" and "nn" - "pp") having the same forward and backward contexts as the set of partial paths ("n" - "p" and "n" - "pp") of node "n" to be created. The process continues to S503.

S503: The reverse directional path separator 717 abandons all nodes connected to node "n" except only node "p". That is, partial path ("n" - "pp") is discarded, as shown in section (d) in FIG. 19B. The process continues to S504.

S504: The reverse directional path separator 717 severs the connection between node "nn" and node "p", as shown in section (e) in FIG. 19B. This creates a new node "nn" which has a connection to node "m" as node "n" has and which has the matched partial path to be completely separated, as shown in section (f) in FIG. 19B. The process ends, thus terminating all processes of the reverse direction node separation. Because all partial path separations are completed, the network reforming in S303 shown in FIG. 17 is invoked and a rewriting rule is applied to the separated partial path.

An execution of S303 allows S113 shown in FIG. 11 to be completed, and invokes S114 for the network merger, which is performed by network merger 715 shown in section (a) in FIG. 7.

The algorithm performed for the reverse direction node separation illustrated in FIGS. 19A and 19B is as follows:

S5001: If the degree of branches connected after a node is greater than one [1], i.e. if a node has a plurality of next branches, only the next branch matching a rewriting rule is separated of all the next branches. This allows the current node to be separated into next branches corresponding to the number of next nodes matching the rewriting rule.

S5002: Set the destination of a previous branch of a separated node the same as the current node.

The following is a more concrete description of the reverse directional partial path separator 717 shown in FIG. 14.

[The reverse directional partial path separator 717]

F1: Store the node number of the part in the network matching a rewriting rule in an array "MATCH [i]". Invert the sequence of the contents of arrays "MATCH". Continue to step F2.

F2: Substitute one [1] into variable "i" and the length of arrays "MATCH" into variable "len". Continue to step F3.

F3: End if the value of variable "i" is equal to that of variable "len", and continue to step F4 otherwise.

F4: Substitute "MATCH [i−1]" into variable "pn" and "MATCH [i]" into variable "cn". Continue to step F5.

F5: Split node "cn" in the network by performing a "normal directional node separation". Revert to step F3.

The "normal directional node separation" is performed by the following procedures:

F5-1: Create a new node and assign "nn" to its node number. Continue to step F5-2.

F5-2: Copy the node name of node "cn" to node "nn". Continue to step F5-3.

F5-3: Store "pn" in the {next node} of node "nn" and add "nn" to the {previous node} of node "pn". Continue to step F5-4.

F5-4: Copy the {previous node} of node "cn" to node "nn". Continue to step F5-5.

F5-5: Add "nn" to {next node} with regard to each node described as the {next node} of node "cn". Continue to step F5-6.

F5-6: Eliminate "pn" from the {next node} of node "cn". Continue to step F5-7.

F5-7: Eliminate "cn" from the {previous node} of node "pn". End.

FIG. 20 is an explanatory chart of a network merger.

More specifically, FIG. 20 illustrates the merger of the same networks shown in FIG. 13 used for describing the separation of a partial path by partial path separator 712.

Network merger 715 shown in section (a) in FIG. 7 comprises the normal directional network merger 718 for sequentially merging the network of a partial path from the head end node and the reverse directional network merger 719 for sequentially merging the network of a partial path from the tail end node. The normal directional network merger 718 and the reverse directional network merger 719 are tandemly connected in either sequence.

First, a case is considered where a path "X.B.C." of network [net 30] shown in section (a) in FIG. 20 is merged backward. Because the path has a "D." and a "Y." connected immediately after the path "X.B.C.", the reverse directional network merger 719 in network merger 715 searches a "C." in respective previous branches of the "D." and the "Y." Because there are two [2] previous branches, network merger 715 checks whether or not it can merge them into one [1]. If the checking result reveals that network merger 715 cannot merge those two [2], it further checks a "B.". Upon finally reaching "X.", it completely merges those two [2] networks.

On checking whether or not it can merge two [2]nodes, which are "C."s in this case, network merger 715 considers the following two [2] conditions.

(1) The two [2] nodes must be of the same kind. (They are both "C." in this case.)

(2) All the connecting destinations of next branches must be of the same kind, when the reverse directional network merger 719 merges networks in the reverse direction. [All the connecting destinations of previous branches must be of the same kind, when the normal directional network merger 718 merges networks in the normal direction.] (Their connecting destinations are both a "D." and a "Y.".)

Because both of these two [2] conditions are met, the reverse directional network merger 719 in network merger 715 can merge "C."s. To merge them together, it connects both branches to a single node, thereby synthesizing the same branches into one [1]. Thus, the reverse directional network merger 719 in network merger 715 obtains a network [net 31] shown in section (b) in FIG. 20. It can similarly merge "B."s. Because an "X." is not a common node, the reverse directional network merger 719 in network merger 715 cannot merge it with something else. Therefore, in the end, the reverse directional network merger 715 outputs a network [net 32] shown in section (c) in FIG. 20.

The reverse directional network merger 719 in network merger 715 supplies this result to the normal directional network merger 718 also in network merger 715, which fails to merge it with something else and outputs network [net 32] "as is" as an output of network merger 715.

FIG. 21 is an explanatory chart of a network converter in a network creator.

More specifically, FIG. 21 shows an example of creating a network by the network converter 722 in the network creator 720 shown in section (b) in FIG. 7.

The above configurations and processes enable networks to be reformed. A preferred embodiment of creating a network is described below.

The character string inputter 721 shown also in section (b) in FIG. 7 receives a character string inputted to the network creator 720, which automatically creates a targeted network by a function similar to that of the network reformer 710 after the converter 722 converts it to simpler networks. The network creator 720 shown in section (b) in FIG. 7 is the same as the network reformer 710 shown in section (a) in FIG. 7, except that the network creator 720 has the character string inputter 721 and the network converter 722 instead of the inputter 711 in the network reformer 710.

The character string inputter 721 receives a character string such as a word character string like the one shown in section (a) in FIG. 21. The partial path separator 723 and the partial path reformer 725 convert simplified networks per rewriting rules stored in rule storer 724, and finally output them as post-reform networks.

A computer memory device (e.g. a disk apparatus) storing a word character string sufficiently realizes the character string inputter 721.

The network converter 722 converts a character string to a network having a data structure e.g. as shown in section (b) in FIG. 21. That is, each node has its node number and node name and the node numbers connected as previous and next contexts are known. The node number connected previously or next which points to itself designates either end of a network. Two [2] character strings indicate a node name.

On converting a word character string to a network structure, because a network does not have branches, the following algorithms can functionally realize the network converter 722.

(1) Substitute one [1] into "cn" and "pn". (cn=1, pn=1)

(2) Read two [2] characters (a node name) from a character string. In case of an end of a character string, skip to process (8).

(3) Write a node name to the "cn"-th column of a field {node name}.

(4) Write "cn" to the "cn"-th column of a field {node number}.

(5) Write "pn" to the "cn"-th column of a field {previous node}.

(6) Write "cn+1" to the "cn"-th column of a field {next node}.

(7) Substitute "cn" into "pn" and "cn+1" into "cn". (pn=cn, cn=cn +1) Revert to process (2) and repeat it and thereafter.

(8) On detecting an end of a character string, write "pn" to the "pn"-th column in field {next node}. [End of processes.]

The field names in parentheses {} are field names in data shown in section (b) in FIG. 8.

After network data are created in the above manner, partial path separator 723, partial path reformer 725, rule storer 724 and network merger 726 in the network creator 720 perform the same processes as those performed by partial path separator 712, partial path reformer 714, rule storer 713 and network merger 715 in the network reformer 710 and can be configured the same.

An application of this invention to creating an acoustic segment network used e.g. by a voice recognizer enables an efficient network to be created. However, this should by no means be construed that an application of this invention is limited only to such a device. It goes without saying that this invention can be similarly applied to any data having a network structure for connecting basic units of data.

What is claimed is:

1. A network reforming apparatus for automatically reforming a network connecting basic units of data using at least one predetermined rewriting rule, comprising:

an inputting means for inputting the network;

a rule storing means for storing the at least one predetermined rewriting rule;

a partial path separating means for splitting a partial path in the network matching a source of rewriting defined by the at least one predetermined rewriting rule stored in said rule storing means, into split partial paths equivalent to the network input by said inputting means; and a partial path reforming means for reforming a split partial path of the network using the at least one predetermined rewriting rule stored in said rule storing means, said partial path separating means including a normal directional partial path separating means for sequentially separating partial paths from a head end node of the network, and a reverse directional partial path separating means for sequentially separating partial paths from a tail end node of the network.

2. The network reforming apparatus according to claim 1, wherein:
said normal directional partial path separating means includes
a branch-path separating means for separating a branch matching the predetermined rewriting rule from all branches connected to a current node of the network, and
a path destination setting means for setting a destination of a separated path to a same destination as the current node, and
said reverse directional partial path separating means includes
a branch-path separating means for separating a branch matching the predetermined rewriting rule from all branches connected from a current node of the network, and
a path origin setting means for setting an origin of a separated path to a same origin as the current node.

3. The network reforming apparatus according to claim 1, wherein:
said network is an acoustic segment network registered in a dictionary used in voice recognition.

4. The network reforming apparatus according to claim 1, further comprising:
a network merging means for merging parts common to both a post-reform partial path to which the at least one predetermined rewriting rule has already been applied and a remaining network stripped of said post-reform partial path.

5. The network reforming apparatus according to claim 4, wherein said partial path separating means comprises:
a normal directional partial path separating means for sequentially separating partial paths from a head end node of the network; and
a reverse directional partial path separating means for sequentially separating partial paths from a tail end node of the network.

6. The network reforming apparatus according to claim 5, wherein:
said normal directional partial path separating means comprises
a branch-path separating means for separating a branch matching the at least one predetermined rewriting rule from all branches connected to a current node of the network; and
a path destination setting means for setting a destination of a separated path to a same destination as the current node; and
said reverse directional partial path separating means comprises
a branch-path separating means for separating a branch matching the at least one predetermined rewriting rule from all branches connected from a current node of the network; and
a path origin setting means for setting an origin of a separated path to a same origin as the current node.

7. The network reforming apparatus according to claim 4, wherein said network merging means comprises:
a normal directional network merging means for sequentially merging common parts from a head end node of the network; and
a reverse directional network merging means for sequentially merging common parts from a tail end node of the network.

8. The network reforming apparatus according to claim 4, wherein:
said network is an acoustic segment network registered in a dictionary used in voice recognition.

9. An apparatus receiving a network, comprising:
a memory storing at least one predetermined rewriting rule having a corresponding at least one rewriting source;
a partial path separator coupled to the memory and to receive the network, for separating partial paths from the network by applying the at least one predetermined rewriting rule to the network based on whether the at least one writing source is present in the network;
a partial path reformer coupled to the memory and to the partial path separator, for correctly reforming the network having partial paths separated by the partial path separator; and
a network merger coupled to the partial path reformer, which merges parts of the network reformed by the partial path reformer which are common to both a post-reform partial path of the network to which the at least one predetermined rewriting rule was previously applied, and a remaining part of the network excluding the post-reform partial path.

10. An apparatus receiving an input network including units of data, comprising:
a memory to store at least one predetermined rewriting rule having a corresponding at least one rewriting source;
a partial path separator coupled to the memory and to receive the input network, to separate at least one partial path from a portion of the input network corresponding to the at least one rewriting source, to form a separated network having at least two separate, connected paths; and
a partial path reformer coupled to the memory and the partial path separator, to apply the at least one predetermined rewriting rule using the at least one rewriting source of the at least one partial path of the separated network, to rewrite the at least one partial path to generate a reformed network, based on the at least one rewriting rule.

11. An apparatus as claimed in claim 10, further comprising:
a network merger coupled to the partial path reformer, to merge at least one common part of the reformed network, to generate a merged network.

12. An apparatus as claimed in claim 11, wherein the network merger includes
a normal directional network merger to merge a common part including two units of data together as one unit of data, if the two units of data are the same and previous units of data relative to a forward direction from a head unit of data to a tail unit of data of the reformed network, associated with one of the two units of data are the same as previous units of data associated with the other of the two units of data, and
a reverse directional network merger to merge a common part including two units of data together as one unit of data, if the two units of data are the same, and subsequent units of data relative to the forward direction, associated with one of the two units of data are the same as subsequent units of data associated with the other of the two units of data.

13. An apparatus as claimed in claim 10, wherein the partial path separator includes a normal directional partial path separator to separate the at least one partial path in a forward direction from the start unit of data to an end unit of data of the input network, and a reverse directional partial path separator to separate the at least one partial path in a reverse direction from the end unit of data to the start unit of data of the input network.

* * * * *

UNITED STATES PATENT AND TRADEMARK OFFICE
CERTIFICATE OF CORRECTION

PATENT NO. : 5,345,537
DATED : September 6, 1994
INVENTOR(S) : Hiroshi TANAKA

It is certified that error appears in the above-indentified patent and that said Letters Patent is hereby corrected as shown below:

Column 5, line 25, after "FIGS." delete "2(b) and 2(c)" and insert

--2(a), 2(b) and 2(c)--.

Column 23, delete all double spacing.

Signed and Sealed this

Tenth Day of January, 1995

Attest:

BRUCE LEHMAN

*Attesting Officer*        Commissioner of Patents and Trademarks